United States Patent
Yadav et al.

(10) Patent No.: US 11,412,191 B2
(45) Date of Patent: Aug. 9, 2022

(54) SYSTEM AND METHOD FOR CONTENT ENHANCEMENT USING QUAD COLOR FILTER ARRAY SENSORS

(71) Applicant: Samsung Electronics Co., Ltd., Suwon-si (KR)

(72) Inventors: Ashish Kumar Yadav, Bangalore (IN); Divyanshu Kumar, Bangalore (IN); Abhijit Dey, Bangalore (IN); Manjunatha Chandrashekhar Achar, Bangalore (IN); Rajib Basu, Bangalore (IN); Kiran Nataraju, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/001,842

(22) Filed: Aug. 25, 2020

(65) Prior Publication Data

US 2021/0067749 A1    Mar. 4, 2021

(30) Foreign Application Priority Data

Aug. 26, 2019  (IN) .............................. 201941034375
May 28, 2020  (IN) .............................. 201941034375

(51) Int. Cl.
  *H04N 5/232*    (2006.01)
  *H04N 9/04*    (2006.01)

(52) U.S. Cl.
  CPC ..... *H04N 9/04559* (2018.08); *H04N 5/23296* (2013.01); *H04N 5/232935* (2018.08)

(58) Field of Classification Search
  CPC ......... H04N 9/04559; H04N 5/232935; H04N 5/23296
  See application file for complete search history.

(56) References Cited

U.S. PATENT DOCUMENTS

| | | | |
|---|---|---|---|
| 9,538,152 B2 | 1/2017 | Shabtay et al. | |
| 9,992,423 B2 | 6/2018 | Krishnamurthy Sagar et al. | |
| 11,108,973 B2* | 8/2021 | Ling | H04N 5/2258 |
| 2010/0321535 A1* | 12/2010 | Rodriguez | H04N 5/23229 348/E5.051 |

(Continued)

OTHER PUBLICATIONS

International Search Report of the International Searching Authority dated Nov. 17, 2020 in connection with International Application No. PCT/KR2020/010712, 3 pages.

(Continued)

*Primary Examiner* — Antoinette T Spinks

(57) ABSTRACT

The present disclosure discloses systems and methods for content enhancement using QCFA sensors of an electronic device. Embodiments herein include previewing contents in a field of view (FOV) of a first QCFA sensor, wherein the first QCFA sensor is operating in a first mode. Embodiments herein include detecting whether a zoom level of the contents previewed meets a first zoom-level criteria, and whether a light condition of the contents previewed meets a light criteria. Further, the first QCFA sensor may be configured to switch from a first mode to a second mode in order to enhance a resolution of the contents being previewed in the FOV of the first QCFA sensor in response to detecting that the zoom level of the contents previewed meets the first zoom-level criteria, and that the light condition of the contents previewed meets the light criteria.

9 Claims, 24 Drawing Sheets

(56) References Cited

U.S. PATENT DOCUMENTS

| | | |
|---|---|---|
| 2011/0069206 A1 | 3/2011 | LeGall et al. |
| 2012/0236181 A1* | 9/2012 | Noyes ................ H04N 5/23296 |
| | | 348/240.2 |
| 2015/0229889 A1 | 8/2015 | Boettiger |
| 2018/0013955 A1 | 1/2018 | Kim et al. |
| 2018/0246331 A1* | 8/2018 | Cheng ................. H04N 13/383 |
| 2020/0112692 A1* | 4/2020 | Ling .................... H04N 5/2628 |
| 2021/0037204 A1* | 2/2021 | Moon .................... H04N 5/378 |

OTHER PUBLICATIONS

Peter, "Quad Bayer sensors: what they are and what they are not," GSMArena, <URL: https://www.gsmarena.com/quad_bayer_sensors_explained-news-37459.php>, Jun. 9, 2019, 5 pages.

\* cited by examiner

SYSTEM AND METHOD FOR CONTENT ENHANCEMENT USING QUAD COLOR FILTER ARRAY SENSORS

CROSS-REFERENCE TO RELATED APPLICATIONS

This application is based on and claims priority under 35 U.S.C. § 119 to Indian Patent Application No. 201941034375, filed on Aug. 26, 2019 and Indian Patent Application No. 201941034375, filed on May 28, 2020, in the Indian Intellectual Property Office, the disclosures of which are herein incorporated by reference in their entirety.

BACKGROUND

1. Field

The present disclosure relates to content enhancement using image sensors of an electronic device and more particularly to a system and method for content enhancement using Quad Color Filter Array (QCFA) sensors of the electronic device.

2. Description of Related Art

In general, an electronic device, for example a smart phone, may utilize image sensors for capturing an image and the image quality. In conventional methods, a preview of the image zoomed at high zoom levels results in a loss of detail of the image, resulting in a fuzzy and out of focus image. Accordingly, the image quality while the image is captured at high zoom levels is drastically reduced. In conventional methods, during real-time preview zoom using a camera application of the smart phone, an output image of the image sensor (actual sensor data) is cropped based on a zoom ratio followed by an upscaling of the cropped image. This results in loss of detail, affecting the preview image quality. Accordingly, a previewed image and a captured image using conventional methods may be fuzzy and/or out of focus. One of the Key Performance Indicators (KPIs) in determining image quality is the sharpness of the captured image. It would be advantageous for the captured image to contain additional image detail. There is a need for a lossless image quality for real-time preview zoom such that the previewed image and the captured image are sharper and more focused, even when the zoom levels are high.

FIG. 1 illustrates a digital zoom method using a QCFA sensor of an electronic device, according to a prior art.

Referring to the FIG. 1, while previewing the contents in a field of view of the QCFA sensor, the QCFA sensor operates in a binning mode. For example, as seen in FIG. 1, a 64MP QCFA sensor is used. While previewing the contents, the QCFA sensor acquires 64 MP of image data and in the binning mode, the QCFA sensor combines 4 adjacent pixels to create one pixel. Since 4 Pixels are combined into one, the final sensor output is ¼th of the sensor size. As illustrated by this example, the QCFA sensor output will be 16MP; i.e. the actual sensor data is 16MP.

At step 102, a zoom level of the contents previewed is 1×. During the 1× zoom level, since a display resolution of the electronic device is 16 MP, an image processor provides the same 16 MP sensor output. Accordingly, there is no loss of detail at the 1× zoom level.

At step 104, the zoom level of the contents previewed is 2×. During the 2× zoom level, the image processor crops the center part of the QCFA sensor output 16 MP. That is, half of the width and half of the height are cropped, resulting in a 4 MP image data (16 MP/4=4 MP). In this example, since the display resolution of the electronic device is 16 MP, the electronic device cannot save the 4 MP image data. Accordingly, the image processor upscales the 4 MP image data to 16 MP image data resulting in a loss of detail at the 2× zoom level.

At step 106, the zoom level of the contents previewed is 8×. During the 8× zoom level, the image processor crops the QCFA sensor output 16 MP by ⅛th of the width and ⅛th of the height, resulting in a 0.25 MP image data (i.e., 16 MP/64=0.25 MP). In the example, since the display resolution of the electronic device is 16 MP, the electronic device cannot save the 0.25 MP image data. Accordingly, the image processor upscales the 0.25 MP image data to a 16 MP image data, resulting in a severe loss of detail at the 8× zoom level. Similarly, as the zoom level increases, the image data from the image processor becomes more and more blurry and/or fuzzy.

FIG. 2 illustrates a block diagram of an implementation flow for zooming in on the contents being previewed, according to a prior art.

Referring to the FIG. 2, in conventional systems, when a user zooms into the contents being previewed by using a camera application of the electronic device, the camera application sends a zoom value to a zoom control block based on the zoom level of the contents being previewed. The zoom value displays information about the four corners of a rectangle that the user wants to zoom in on. The zoom control block translates crop parameters based upon the zoom value received from the camera application to the image processor, and the image processor crops the contents that the user may want to zoom in on. In conventional systems, even when the zoom level of the contents previewed increases, the zoom control block does not have the intelligence to output a lossless image or a sharp and focused image.

In view of the above, it is desirable to address the above mentioned disadvantages or other shortcomings.

SUMMARY

One object of certain embodiments according to this disclosure is to provide a system and method for content enhancement using QCFA sensors.

Another object of certain embodiments according to this disclosure is to preview contents in a field of view of a first QCFA sensor of an electronic device, wherein the first QCFA sensor is operating in a first mode.

Another object of certain embodiments according to this disclosure is to detect whether a zoom level of the contents previewed meets a first zoom-level criteria, and whether a light condition of the contents previewed meets a light criteria.

Another object of certain embodiments according to this disclosure is to configure the first QCFA sensor to switch from the first mode to a second mode to enhance a resolution of the contents previewed in the field of view of the first QCFA sensor in response to detecting that the zoom level of the contents previewed in the field of view of the first QCFA sensor meets the first zoom-level criteria, and the light condition of the contents previewed in the field of view of the first QCFA sensor meets the light criteria.

Another object of certain embodiments according to this disclosure is to maintain the first QCFA sensor in the first mode in response to detecting that at least one of the zoom level of the contents previewed in the field of view of the first QCFA sensor is not meeting the first zoom level criteria and the light condition of the contents previewed in the field of view of the first QCFA sensor is not meeting the light criteria.

Another object of certain embodiments according to this disclosure is to display the enhanced content in the field of view of the first QCFA sensor.

The above information is presented as background information only to assist with an understanding of the disclosure. No determination has been made, and no assertion is made, as to whether any of the above might be applicable as prior art with regard to the disclosure.

Accordingly, the embodiments herein disclose a system and method for content enhancement using QCFA sensors of an electronic device. The embodiments include previewing contents in a field of view of a first QCFA sensor of the electronic device, wherein the first QCFA sensor is operating in a first mode. Further, certain embodiments include detecting whether a zoom level of the contents previewed meets a first zoom-level criteria, and a light condition of the contents previewed meets a light criteria. Further, certain embodiments include configuring the first QCFA sensor to switch from the first mode to a second mode to enhance a resolution of the contents previewed in the field of view of the first QCFA sensor in response to detecting that the zoom level of the contents previewed in the field of view of the first QCFA sensor meets the first zoom-level criteria, and the light condition of the contents previewed in the field of view of the first QCFA sensor meets the light criteria. Further, certain embodiments include maintaining the first QCFA sensor in the first mode in response to detecting that at least one of the zoom level of the contents previewed in the field of view of the first QCFA sensor is not meeting the first zoom level criteria and the light condition of the contents previewed in the field of view of the first QCFA sensor is not meeting the light criteria. Further, the embodiment includes displaying the enhanced content in the field of view of the first QCFA sensor.

In an embodiment, after configuring the first QCFA sensor to switch to a second mode, the method further includes previewing the contents in the field of view of the first QCFA sensor, wherein the first QCFA sensor is operating in the second mode. The method further includes, determining the zoom level of the contents previewed meets a second zoom-level criteria.

In an embodiment, the method further includes previewing the contents in the field of view of a second QCFA sensor on determining that the zoom level of the contents previewed meets the second zoom-level criteria, wherein the second QCFA sensor is operating in the first mode. The method further includes detecting whether the zoom level of the contents previewed in the field of view of the second QCFA sensor meets a third zoom-level criteria, and the light condition of the contents previewed in the field of view of the second QCFA sensor meets the light criteria. The method further includes configuring the second QCFA sensor to switch from the first mode to the second mode to enhance the resolution of the contents previewed in the field of view of the second QCFA sensor in response to detecting that the zoom level of the contents previewed in the field of view of the second QCFA sensor meets the third zoom-level criteria, and the light condition of the contents previewed in the field of view of the second QCFA sensor meets the light criteria. The method further includes maintaining the second QCFA sensor in the first mode in response to detecting that at least one of the zoom level of the contents previewed in the field of view of the second QCFA sensor is not meeting the third zoom level criteria and the light condition of the contents previewed in the field of view of the second QCFA sensor is not meeting the light criteria. The method further includes displaying the enhanced content in the field of view of the second QCFA sensor.

In an embodiment, configuring the first QCFA sensor to switch to the second mode includes switching the first QCFA sensor from the first mode to the second mode. The method further includes previewing the contents in the field of preview of the first QCFA sensor, wherein the first QCFA sensor is operating in the second mode. The method further includes centrally cropping the contents previewed in the second mode of the first QCFA sensor into half in both dimensions.

In an embodiment, displaying the enhanced content in the field of view of the first QCFA sensor includes enhancing the centrally cropped content in the field of preview of the first QCFA sensor, wherein the first QCFA sensor is operating in the second mode. The method further includes displaying the enhanced content in the field of view of the first QCFA sensor.

In an embodiment, configuring the second QCFA sensor to switch to the second mode includes switching the second QCFA sensor from the first mode to the second mode. The method further includes previewing the contents in the field of preview of the second QCFA sensor, wherein the second QCFA sensor is operating in the second mode and centrally cropping the contents previewed in the second mode of the second QCFA sensor into half in both dimensions.

In an embodiment, wherein displaying, by the enhanced content in the field of view of the second QCFA sensor includes enhancing the centrally cropped content in the field of preview of the second QCFA sensor, wherein the second QCFA sensor is operating in the second mode. The method further includes displaying the enhanced content in the field of view of the second QCFA sensor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
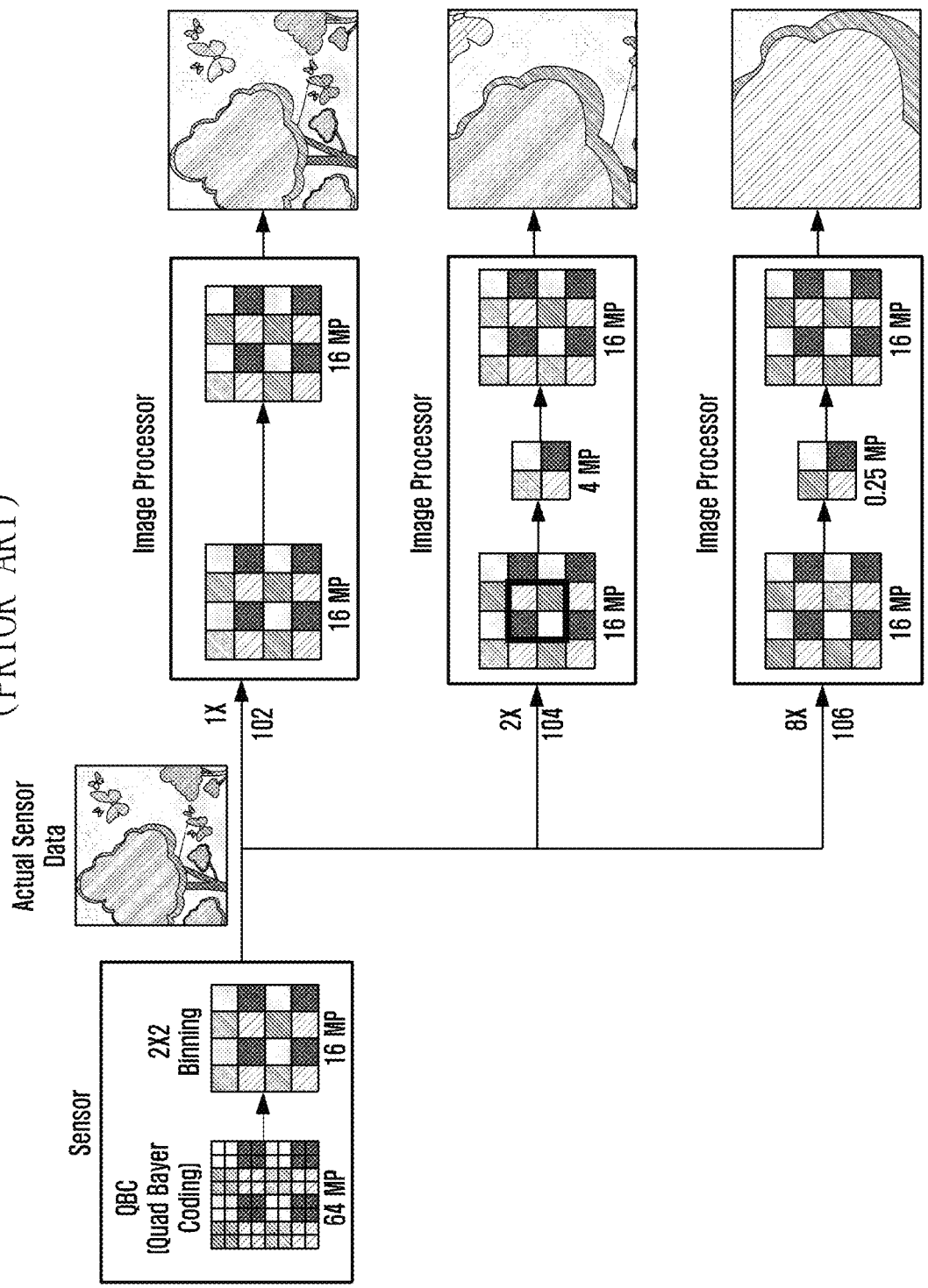
FIG. 1 illustrates a digital zoom method using a QCFA sensor of an electronic device, according to a prior art.

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Certain embodiments according to this disclosure disclose systems and methods for content enhancement using QCFA sensors of an electronic device. The embodiments include previewing contents in a field of view of a first QCFA sensor of the electronic device, wherein the first QCFA sensor is operating in a first mode. Further, the embodiment includes detecting whether a zoom level of the contents previewed meets a first zoom-level criteria, and a light condition of the contents previewed meets a light criteria. Further, the embodiment includes configuring the first QCFA sensor to switch from the first mode to a second mode to enhance a resolution of the contents previewed in the field of view of the first QCFA sensor in response to detecting that the zoom level of the contents previewed in the field of view of the first QCFA sensor meets the first zoom-level criteria, and the light condition of the contents previewed in the field of view of the first QCFA sensor meets the light criteria. Further, the embodiment includes maintaining the first QCFA sensor in the first mode in response to detecting that at least one of the zoom level of the contents previewed in the field of view of the first QCFA sensor is not meeting the first zoom level criteria and the light condition of the contents previewed in the field of view of the first QCFA sensor is not meeting the light criteria. Further, the embodiment includes displaying the enhanced content in the field of view of the first QCFA sensor.

Referring now to the drawings and more particularly to the illustrative examples of FIGS. 3 through 16. Where similar reference characters denote corresponding features consistently throughout the figure, these are shown in certain embodiments.

Figure 3A:
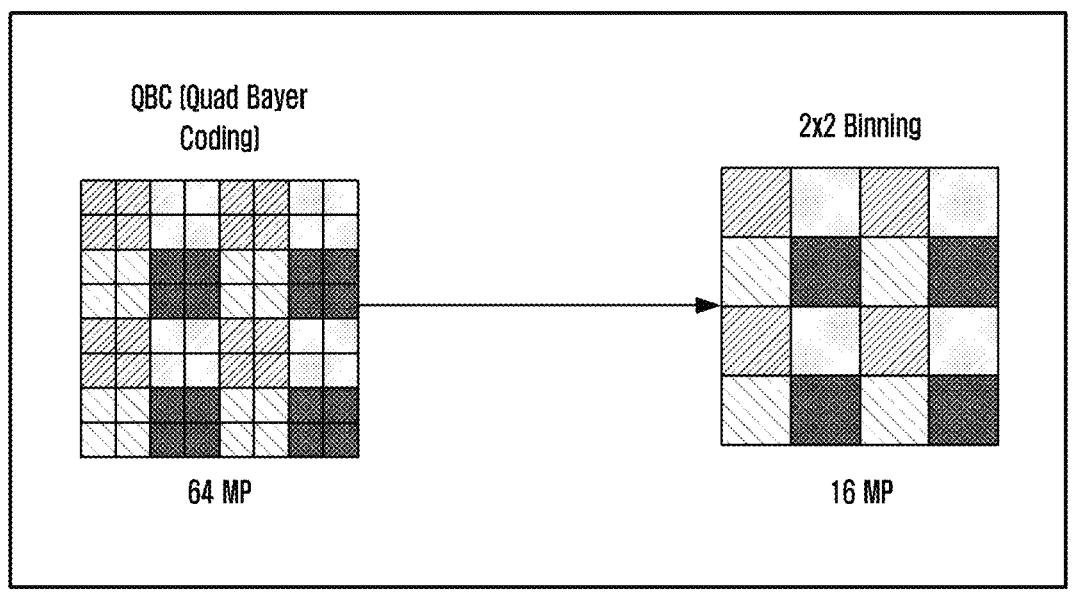
FIGS. 3A and 3B illustrate schematic diagrams of different modes of a QCFA sensor, according to certain embodiments of this disclosure.
Figure 3B:
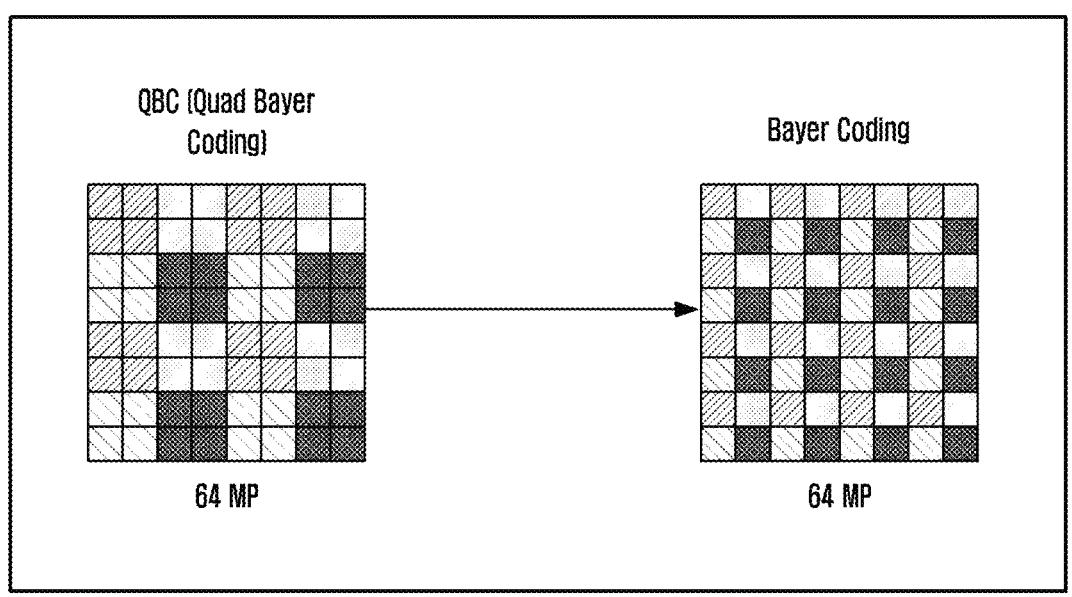

FIGS. 3A and 3B illustrate schematic diagrams of different modes of a QCFA sensor, according to an embodiment as disclosed herein.

FIG. 3A illustrates an example of a first mode of the QCFA sensor. This may be a binning mode, which may generate brighter images in a dark light scenario. In a dark light scenario, the QCFA sensor operates in the binning mode. In the dark light scenario operating in the binning mode of the QCFA sensor, 4 adjacent pixels of an image may be combined into one pixel, displaying a lower resolution, less noisy, brighter images. Since 4 Pixels are combined into one, the final sensor output is ¼th of the sensor size. As illustrated in FIG. 3A, while previewing contents, the QCFA sensor acquires 64 MP of image data. In the binning mode, the QCFA sensor may combine 4 adjacent pixels to create one pixel. In the example shown in FIG. 3A, the QCFA sensor output will be 16MP; i.e. the actual sensor data is 16MP.

FIG. 3B illustrates an example of a second mode of a QCFA sensor. This example may be operating in a remosaic mode, which may generate a full resolution output in a bright light scenario. In a bright light scenario, the full resolution remosaic mode of the QCFA sensor may output the full megapixel capability of a QCFA sensor. In this example, the QCFA sensor may provide an improved mega pixel image in a bright light scenario. As illustrated in the example of FIG. 3B, while capturing image contents, the QCFA sensor acquires 64 MP of image data; and in the full resolution remosaic mode, the QCFA sensor output will be 64 MP, i.e. the actual sensor data is 64 MP.

In existing systems, while previewing contents in the field of view of the QCFA sensor, the QCFA sensor is operating in the binning mode. Unlike existing systems, in at least one method according to this disclosure, the QCFA sensor may be configured to switch from a binning mode to a full resolution remosaic mode when the zoom level of the contents previewed meets a zoom level criteria, and a light condition of the contents previewed meets a light criteria. For example, the zoom level criteria may be a zoom of 2×, and the light criteria may be an ambient light criteria. When the zoom level of the contents previewed in the field of view of the QCFA sensor meets 2× zoom and the light condition of the contents previewed in the field of view of the QCFA sensor meets the light criteria, i.e. the ambient light criteria (normal light or bright light), the QCFA sensor is switched from the binning mode to the full resolution remosaic mode. The proposed method for content enhancement using QCFA sensor of an electronic device 600 (see, for example, FIG. 6), may generate a lossless image quality at zoom levels of 2× and above, resulting in high detailed images. In this proposed method, the previewed image and the captured image at zoom levels 2× and above 2× may be sharper and better focused. When a subject of the image or the contents of the image is sharp, the image appears more clear and the image may convey additional details, providing enhanced contents in the field of view of the QCFA sensor (high detailed image).

Figure 4:
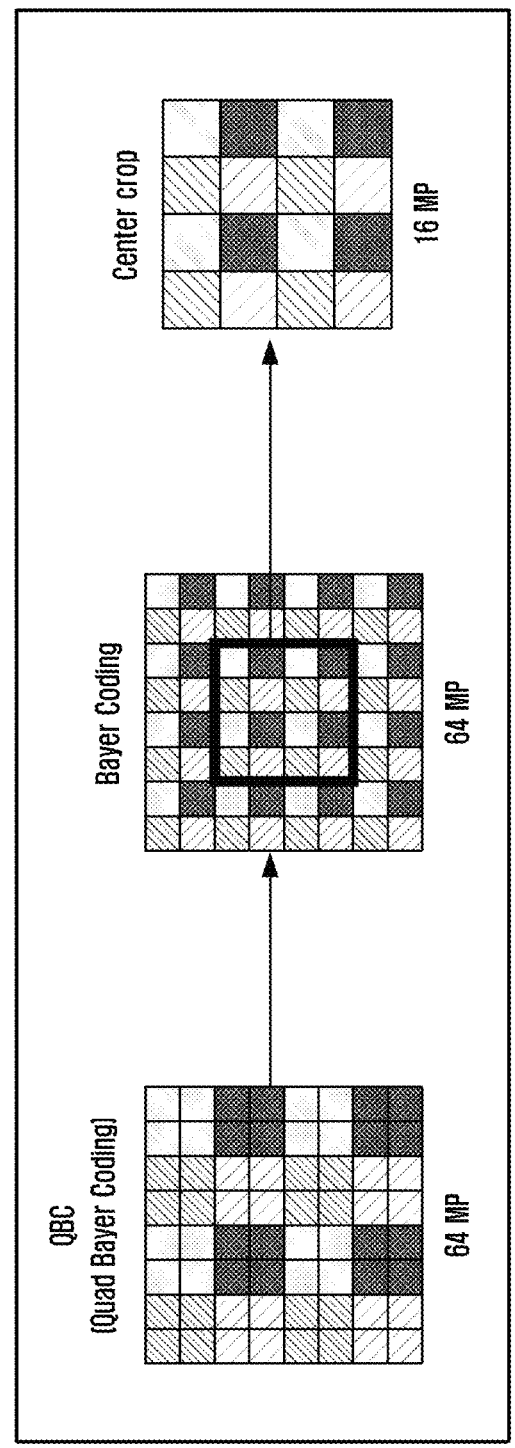
FIG. 4 illustrates a schematic diagram showing a remosaic crop mode of a QCFA sensor, according to certain embodiments of this disclosure.

FIG. 4 illustrates a schematic diagram of a remosaic crop mode of a QCFA sensor, according to certain embodiments of this disclosure.

Referring to the illustrative example of FIG. 4, in a proposed method, a new mode (for example, a remosaic crop mode) for content enhancement using the QCFA sensor is disclosed.

In the illustrative example of a remosaic crop mode of FIG. 4, when the zoom level of the contents previewed meets the zoom level criteria and the light condition of the contents previewed meets the light criteria, the electronic device 600 may switch the QCFA sensor from a binning mode to a remosaic mode. The QCFA sensor hardware may centrally crop the image contents in the remosaic mode of the QCFA sensor by half in both dimensions; i.e. half of the width and half of the height are cropped.

In the illustrative example of the remosaic crop mode of FIG. 4, first the QCFA sensor is configured to remosaic mode and the QCFA sensor hardware outputs center cropped output of the remosaic mode by configuring crop register settings of the QCFA sensor. Since ½ of the width and ½ of the height are cropped, the final QCFA sensor output is ¼th of the sensor size but the field of view is 2× zoomed. As illustrated in FIG. 4, when the zoom level of the contents previewed meets the zoom level criteria and the light condition of the contents previewed meets the light criteria, the QCFA sensor starts operating in the full resolution remosaic mode. The QCFA sensor acquires 64 MP of image data and in the full resolution remosaic mode, Bayer coding is implemented, resulting in a 64 MP full resolution image. The QCFA sensor hardware crops the center part of the 64 MP image. When the QCFA sensor hardware crops the center part of the image by exactly ½ of the width and ½ of the height, the QCFA sensor automatically generates a 2× zoomed image as output. As illustrated in the example of FIG. 4, the QCFA sensor output is 16 MP. Thus, in this example's new mode, i.e. a remosaic crop mode, the QCFA sensor output is a cropped 2× zoomed image. Further at zoom levels higher than 2×, an image processor 660 (see, for example, FIG. 6), of the electronic device 600 further crops the 2× zoomed image output of the QCFA sensor based on zoom levels.

Figure 5:
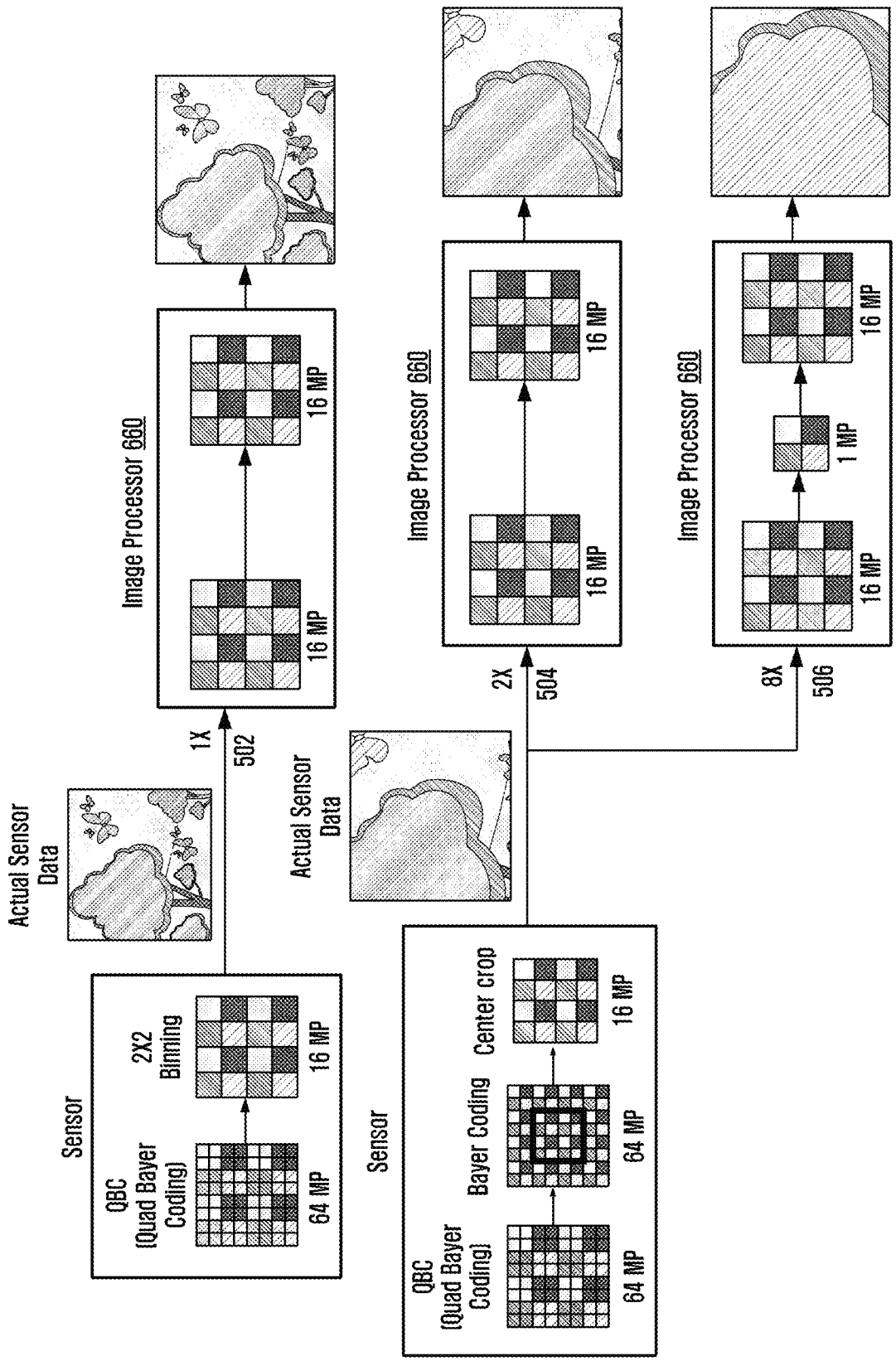
FIG. 5 illustrates a method for content enhancement using QCFA sensors and a method for digital zoom using the QCFA sensor of the electronic device according to certain embodiments of this disclosure.

FIG. 5 illustrates a block diagram of a method for content enhancement using QCFA sensors, and also illustrates a method for digital zoom using the QCFA sensor of the electronic device 600, according to certain embodiments of this disclosure.

Referring to the illustrative example of FIG. 5, when the zoom level of the contents previewed in the field of view of the QCFA sensor is at the 1× zoom level, the QCFA sensor operates in the first mode (binning mode). For example, as illustrated in FIG. 5, a 64MP QCFA sensor is used. While previewing contents, the QCFA sensor acquires 64 MP of image data and in the binning mode, the QCFA sensor combines 4 adjacent pixels to create one pixel. Since 4 Pixels are combined into one, the final sensor output is $¼^{th}$ of the sensor size. Here, as illustrated by example, the QCFA sensor output will be 16MP, i.e. the actual sensor data is 16MP.

During the 1× zoom level (at step 502), since a display resolution of the electronic device 600 is 16 MP, the image processor 660 outputs the same 16 MP sensor output. Accordingly, there is no loss of detail at the 1× zoom level.

While previewing contents in the field of view of the QCFA sensor of the electronic device 600, the QCFA sensor is operating in the binning mode. Now, when the zoom level of the contents previewed meets the zoom level criteria and the light condition of the contents previewed meets the light criteria, the electronic device 600 is configured to switch the QCFA sensor from the binning mode to the remosaic mode. For example, the zoom level criteria may be a 2× zoom level, and the light criteria may be the ambient light criteria (normal light or bright light). The image contents are previewed in the remosaic mode. The QCFA sensor hardware centrally crops the image contents in the remosaic mode of the QCFA sensor by half in both dimensions (i.e. length and width). Hence, in the remosaic crop mode, the QCFA sensor hardware outputs a center cropped output of the remosaic mode by configuring crop register settings of the QCFA sensor. Since ½ of the width and ½ of the height are cropped, the final QCFA sensor output is ¼th of the sensor size but the field of view is 2× zoomed.

As illustrated in the example of FIG. 5, when the zoom level of the contents previewed in the field of view of the QCFA sensor is at the 2× zoom level and the light condition of the contents previewed meets the light criteria, the electronic device 600 may switch the QCFA sensor from the binning mode to the remosaic mode. In this scenario, the QCFA sensor acquires 64 MP of image data and in the full resolution remosaic mode, Bayer coding is implemented, resulting in a 64 MP full resolution image. The QCFA sensor hardware may crop the center part of the 64 MP image. When the QCFA sensor hardware crops the center part of the image with exactly ½ of the width and ½ of the height the QCFA sensor automatically generates a 2× zoomed image as output. As illustrated in FIG. 5, the QCFA sensor output is 16 MP and the QCFA sensor output is the 2× zoomed image.

During the 2× zoom level (step 504), since the display resolution of the electronic device 600 is 16 MP, the image processor 660 outputs the same 16 MP sensor output. In other words, there is no loss of detail at the 2× zoom level. 16 MP sensor output may be saved. The electronic device 600 outputs a lossless image at the 2× zoom level.

In a proposed method, at zoom levels higher than 2×, the image processor 660 of the electronic device 600 further crops the 2× zoomed image output of the QCFA sensor based on zoom levels.

As illustrated in FIG. 5, at step 506, the zoom level of the contents previewed in the field of view of the QCFA sensor is 8× and the light condition of the contents previewed meets the configured light criteria. In this example, since the zoom level of the contents previewed in the field of view of the QCFA sensor is beyond the 2× zoom level and the light condition of the contents previewed meets the light criteria, the QCFA sensor automatically provides a 2× zoomed image as output. As illustrated in FIG. 5, the QCFA sensor output is 16 MP and the QCFA sensor output is the 2× zoomed image. During the 8× zoom level, the image processor 660 of the electronic device 600 further crops the 2× zoomed sensor output. The image processor 660 crops the QCFA sensor output 16 MP further by ¼th of and ¼th of height resulting in a 1 MP image data (16 MP/16=1 MP). Since the display resolution of the electronic device 600 is 16 MP, the image processor 660 upscales the 1 MP image data to 16 MP image data.

As illustrated in the proposed method, the QCFA sensor hardware outputs the 2× zoomed image as the final QCFA sensor output. Hence, at the 2× zoom level, there is no need to zoom and upscale the final QCFA sensor output by the image processor 660 of the electronic device 600. As illustrated in FIG. 5, a 16 MP image data received from the QCFA sensor hardware is displayed by the electronic device 600. Unlike existing systems, there is no cropping and upscaling required at the 2× zoom level. Accordingly, the image quality for real-time preview zoom in the proposed method is better and the previewed image and the captured image are sharp and focused.

Unlike existing systems, instead of upscaling a 0.25 MP image data to 16MP at the 8× zoom level, in the proposed method, at the 8× zoom level the 1 MP image data is upscaled to 16 MP. Accordingly, the image quality for real-time preview zoom in the proposed method is improved, and both the previewed image and the captured image are sharper and more focused. Similarly, as the zoom level increases, unlike existing systems, the image quality for real-time preview zoom in the proposed method is improved and the previewed image and the captured image are sharper and more focused.

Figure 6:
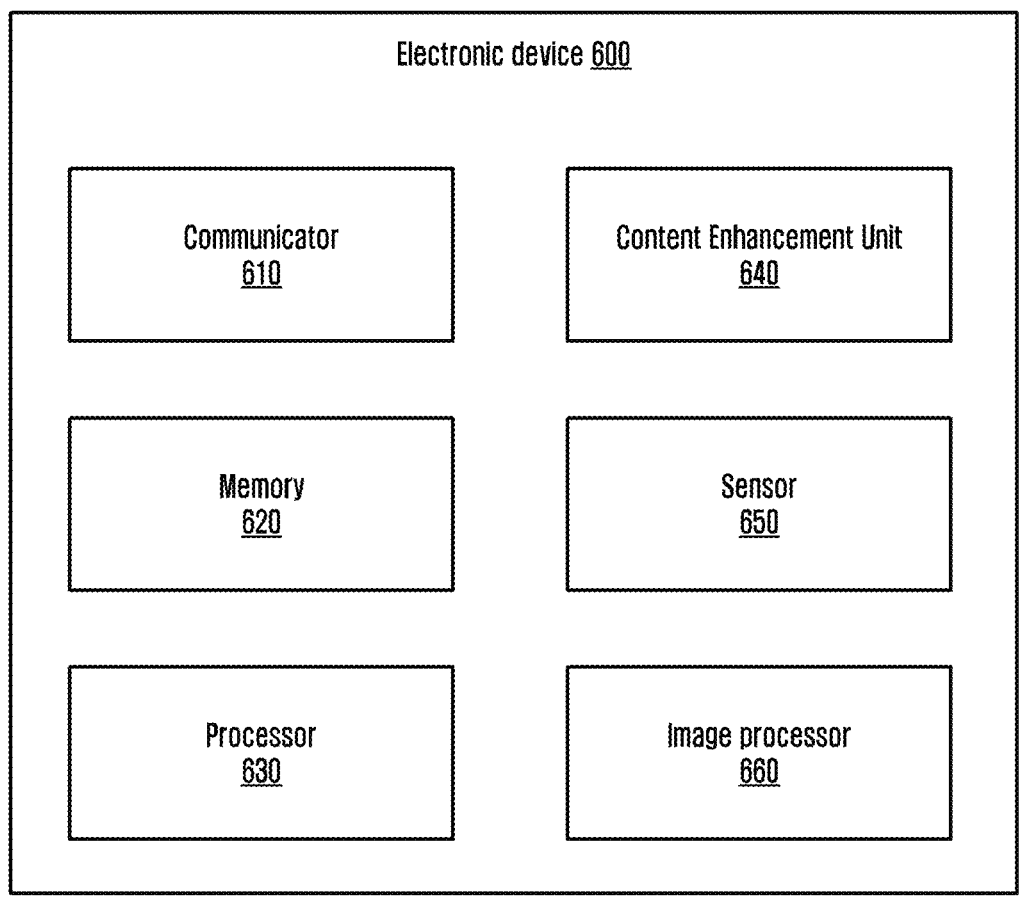
FIG. 6 illustrates a block diagram of an electronic device for content enhancement using QCFA sensors, according to certain embodiments of this disclosure.

FIG. 6 illustrates a block diagram of an electronic device 600 for content enhancement using QCFA sensors, according to certain embodiments of this disclosure.

Examples for the electronic device 600 include but are not limited to a mobile phone, a smart phone, a tablet, a handheld device, a laptop, a computer, a wearable computing device, an Internet of Things (IoT) device, a camera, a web camera, a digital single-lens reflex (DSLR) camera, a video camera, a digital camera, a mirror-less camera, a still camera, and the like. The electronic device 600 may also include a user application interface and a camera application for previewing and capturing media or images. The camera application may be used in developing a graphical user interface (GUI). The electronic device 600 may include at least one of two image sensors, three image sensors, four image sensors, etc. An example of an image sensor may be a QCFA sensor.

Referring to the illustrative example of FIG. 6, the electronic device 600 includes a communicator 610, a memory 620, a processor 630, a content enhancement unit 640, a sensor 650, and the image processor 660. The sensor 650 may be the image sensor, for example the QCFA sensor. The image processor 660 (also referred to as the image signal processor (ISP) 660) is a specialized digital signal processor used for image processing in the electronic device 600. The electronic device 600 may include more than one sensor 650, such as a first QCFA sensor and a second QCFA sensor.

The communicator 610 may be configured for communicating internally between internal units and external devices via one or more networks. The memory 620 may include one or more computer-readable storage media. The memory 620 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory 620 may, in some examples, be considered a non-transitory storage medium. The term "non-transitory" may indicate that the storage medium is not embodied in a carrier wave or a propagated signal. However, the term "non-transitory" should not be interpreted that the memory 620 is non-movable. In some examples, the memory 620 can be configured to store larger amounts of information than a memory 620. In certain examples, a non-transitory storage medium may store data that can, over time, change (e.g., in Random Access Memory (RAM) or cache).

The processor 630 may be coupled to the memory 620 and the communicator 610; and the processor 630 may be communicatively coupled to the content enhancement unit 640, the sensor 650, and the image processor 660. The processor 630 may be configured to preview contents in a field of view of a first QCFA sensor of the electronic device 600, wherein the first QCFA sensor is operating in a first mode. For example, the first mode may be the binning mode of the QCFA sensor.

The processor 630 may be configured to detect whether a zoom level of the contents previewed meets a first zoom-level criteria, and whether a light condition of the contents previewed meets a light criteria. For example, the first zoom level criteria may be a 2× zoom level of the contents previewed in the field of view of the first QCFA sensor. The light criteria may be the ambient light criteria, for example: normal light or bright light.

The processor 630, upon detecting that the zoom level of the contents previewed in the field of view of the first QCFA sensor meets the first zoom-level criteria, and the light condition of the contents previewed in the field of view of the first QCFA sensor meets the light criteria, is configured to switch the first QCFA sensor from the first mode to a second mode in order to enhance a resolution of the contents previewed in the field of view of the first QCFA sensor. For example, the second mode may be a remosaic mode of the QCFA sensor.

The processor 630, upon detecting that at least one of the zoom level of the contents previewed in the field of view of the first QCFA sensor is not meeting the first zoom level criteria and the light condition of the contents previewed in the field of view of the first QCFA sensor is not meeting the light criteria, is configured to maintain the first QCFA sensor in the first mode. The processor 630 is also configured to display the enhanced content in the field of view of the first QCFA sensor.

The processor 630, after configuring the first QCFA sensor to switch to the second mode, is further configured to preview the contents in the field of view of the first QCFA sensor, wherein the first QCFA sensor is operating in the second mode. The processor 630 may be configured to determine the zoom level of the contents previewed meets a second zoom-level criteria. For example, the second zoom level criteria may be the 4× zoom level. The processor 630 may be further configured to activate a second QCFA sensor, wherein the second QCFA sensor is operating in the first mode. For example, the first QCFA sensor may be a wide angle sensor and the second QCFA sensor may be a telephoto sensor.

The processor 630 may be configured to preview contents in a field of view of the second QCFA sensor of the electronic device 600, wherein the second QCFA sensor is operating in the first mode. The processor 630 may be further configured to detect whether the zoom level of the contents previewed meets a third zoom-level criteria and the light condition of the contents previewed meets the light criteria. For example, the third zoom level criteria may be the 8× zoom level. The light criteria may be the ambient light criteria for example normal light or bright light.

The processor 630, upon detecting that the zoom level of the contents previewed in the field of view of the second QCFA sensor meets the third zoom-level criteria; and the light condition of the contents previewed in the field of view of the second QCFA sensor meets the light criteria may be configured to switch the second QCFA sensor from the first mode to the second mode to enhance the resolution of the contents previewed in the field of view of the second QCFA sensor.

The processor 630, upon detecting that at least one of the zoom level of the contents previewed in the field of view of the second QCFA sensor is not meeting the third zoom level criteria and the light condition of the contents previewed in the field of view of the second QCFA sensor is not meeting the light criteria may be configured to maintain the second QCFA sensor in the first mode. The processor 630 is also configured to display the enhanced content in the field of view of the second QCFA sensor.

Although the illustrative example of FIG. 6 shows hardware elements of the electronic device 600, it is to be understood that other embodiments are not limited thereon. For example, in other embodiments, the electronic device 600 may include a smaller or larger number of elements. Further, the labels or names of the elements are used only for illustrative purposes and should not be construed in any way to limit the scope of the disclosure. One or more components can be combined together to perform the same or substantially similar function for content enhancement using QCFA sensors for a electronic device 600.

Figure 7A:
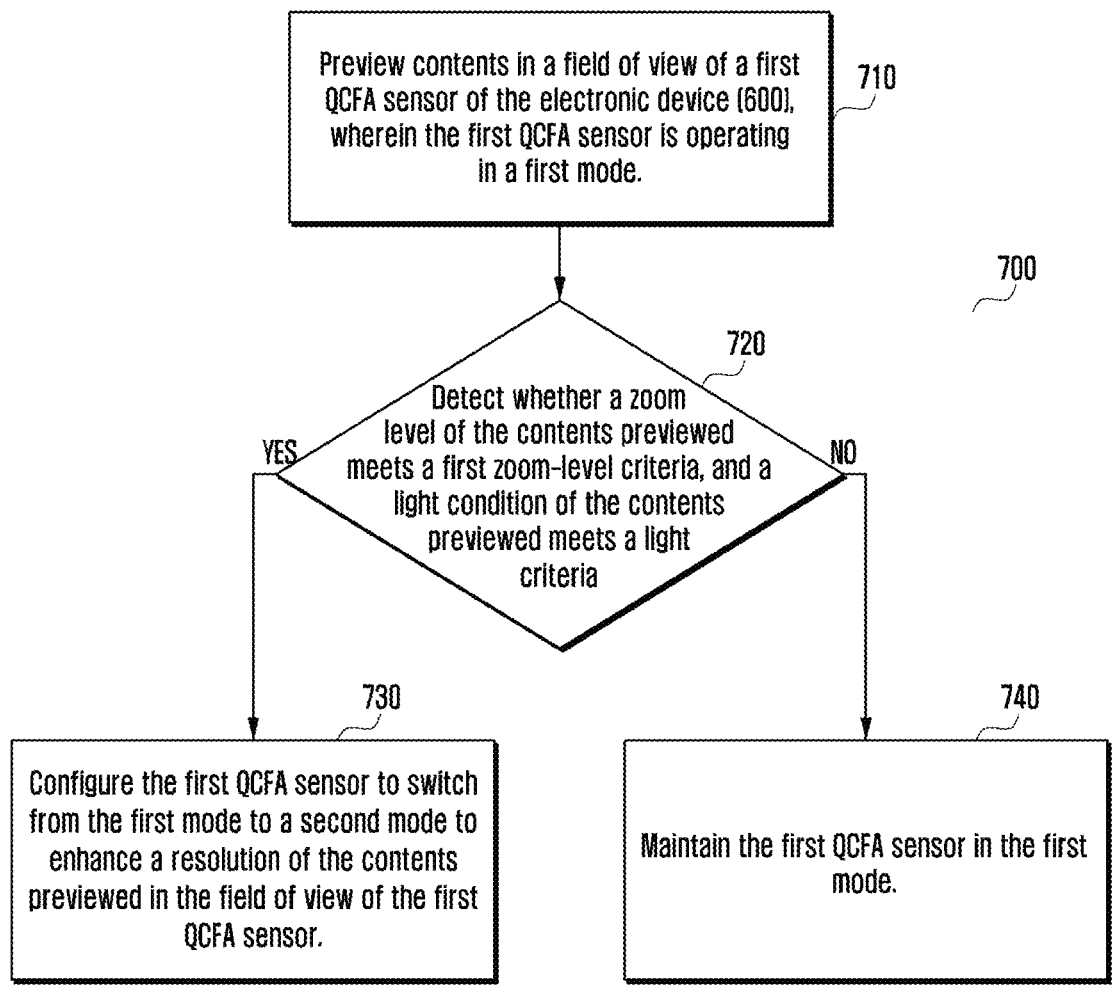
FIG. 7A illustrates a flow diagram of a method for content enhancement using QCFA sensors, according to certain embodiments of this disclosure.

FIG. 7A illustrates a flow diagram of a flow 700 of a method for content enhancement using QCFA sensors, according to certain embodiments of this disclosure.

Referring to the illustrative example of FIG. 7A, at step 710, the method may include previewing the contents in a field of view of the first QCFA sensor of the electronic device 600, wherein the first QCFA sensor is operating in a first mode. At step 720, the method may include detecting whether the zoom level of the contents previewed meets the first zoom-level criteria, and the light condition of the contents previewed meets the light criteria. At step 730, on detecting that the zoom level of the contents previewed in the field of view of the first QCFA sensor meets the first zoom-level criteria, and on detecting that the light condition of the contents previewed in the field of view of the first QCFA sensor meets the light criteria, the method may further include: configuring the first QCFA sensor to switch from the first mode to the second mode to enhance the resolution of the contents previewed in the field of view of the first QCFA sensor. At step 740, on detecting that at least one of the zoom level of the contents previewed in the field of view of the first QCFA sensor is not meeting the first zoom level criteria, and the light condition of the contents previewed in the field of view of the first QCFA sensor is not meeting the light criteria, the method may include maintaining the first QCFA sensor in the first mode. The method may further include displaying the enhanced content in the field of view of the first QCFA sensor.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the invention.

Figure 7B:
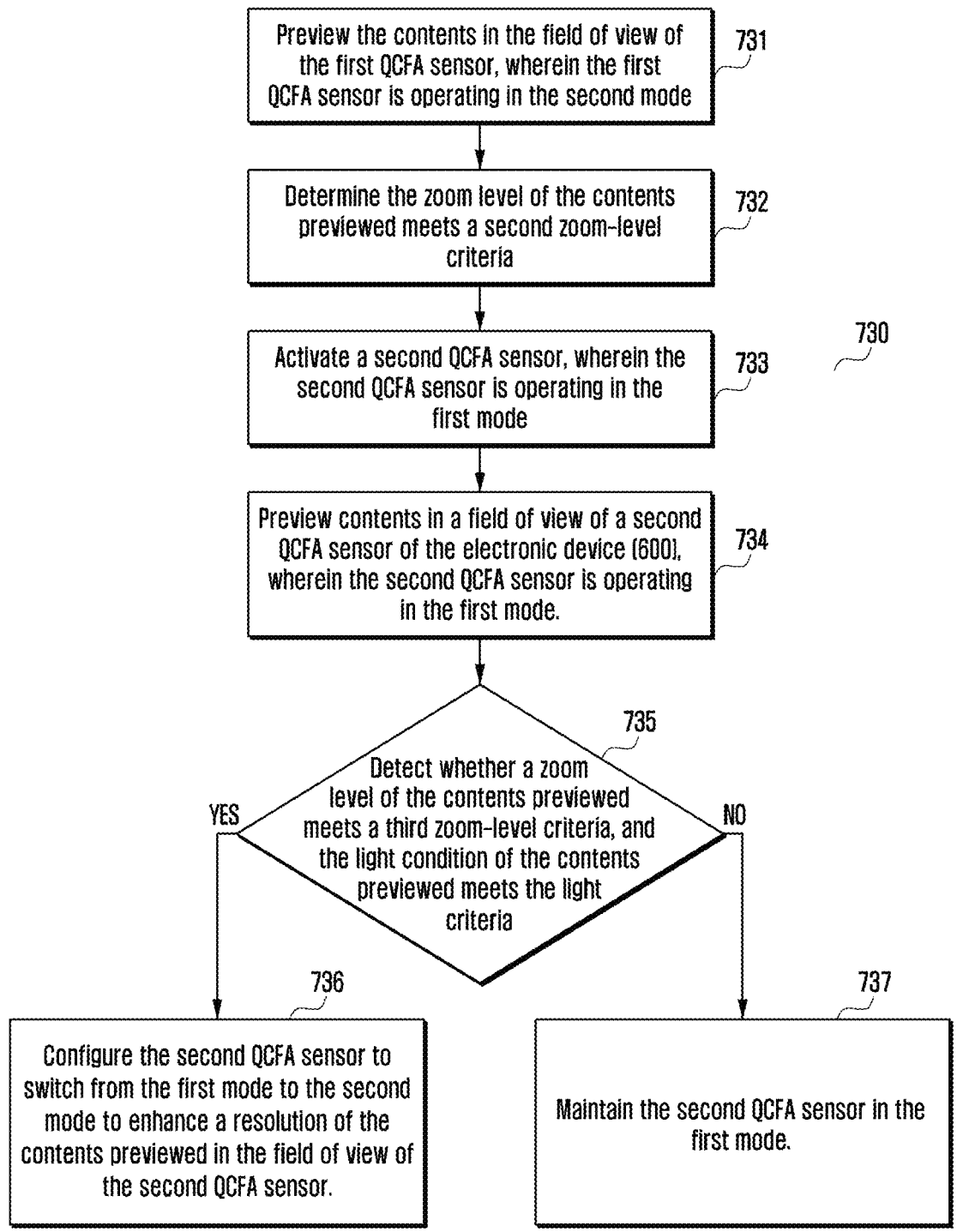
FIG. 7B illustrates a flow diagram of a method for content enhancement after configuring the first QCFA sensor to switch to a second mode according to certain embodiments of this disclosure.

FIG. 7B illustrates a flow diagram of a flow 730 of a method for content enhancement after configuring a first QCFA sensor to switch to a second mode, according to certain embodiments of this disclosure.

Referring to the illustrative example of FIG. 7B, at step 731, the method may include previewing the contents in the field of view of a first QCFA sensor, wherein the first QCFA sensor is operating in a second mode. At step 732, the method may include determining whether the zoom level of the contents being previewed meets the second zoom-level criteria. At step 733, the method may include activating the second QCFA sensor, wherein the second QCFA sensor is operating in the first mode. At step 734, the method may further include previewing the contents in the field of view of the second QCFA sensor of the electronic device 600, wherein the second QCFA sensor is operating in the first mode. At step 735, the method may include detecting whether the zoom level of the contents being previewed meets the third zoom-level criteria, and whether the light condition of the contents previewed meets the light criteria. At step 736, on detecting that the zoom level of the contents previewed in the field of view of the second QCFA sensor meets the third zoom-level criteria; and detecting that the light condition of the contents previewed in the field of view of the first QCFA sensor meets the light criteria, the method further includes configuring the second QCFA sensor to switch from the first mode to the second mode to enhance the resolution of the contents previewed in the field of view of the second QCFA sensor. At step 737, on detecting that at least one of the zoom level of the contents previewed in the field of view of the second QCFA sensor is not meeting the third zoom level criteria and the light condition of the contents previewed in the field of view of the second QCFA sensor is not meeting the light criteria, the method may include maintaining the second QCFA sensor in the first mode. The method further includes displaying the enhanced content in the field of view of the second QCFA sensor.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 8:
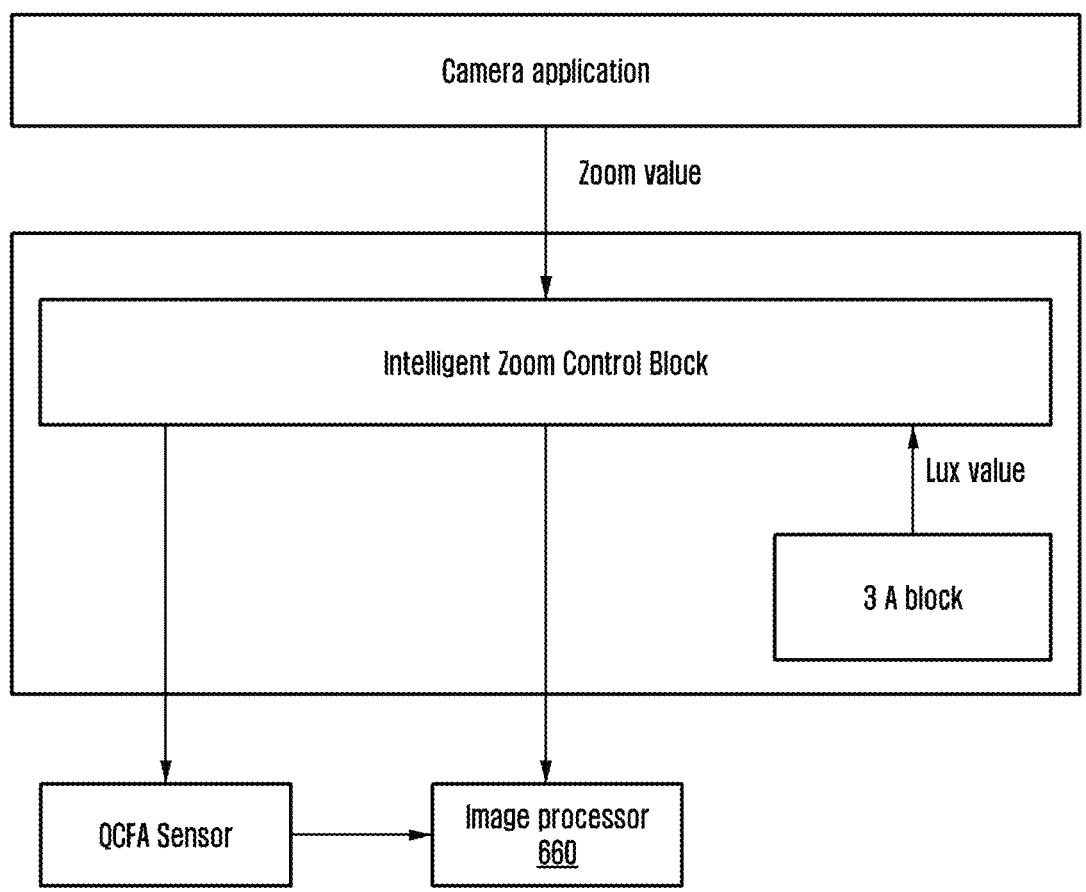
FIG. 8 illustrates a block diagram of an implementation flow for zooming in on the contents being previewed, according to certain embodiments of this disclosure.

FIG. 8 illustrates a block diagram of an implementation flow for zooming in on the contents previewed, according to certain embodiments of this disclosure. Referring to the illustrative example of FIG. 8, a user may be previewing contents in the field of view of the QCFA sensor of the electronic device 600. Whenever the user zooms in on the contents being previewed using a camera application of the electronic device 600, the camera application may send a zoom value to an intelligent zoom control block based on the zoom level of the contents being previewed. The zoom value outputs information about four corners of a rectangle (i.e., the coordinates of the four corners of the rectangle) that the user may want to zoom into. A 3A block may calculate a lux index of the contents previewed in the field of view of the QCFA sensor. In the proposed method, as illustrated in FIG. 8, after calculating the lux index, the 3A block may send a lux value to the intelligent zoom control block. The lux value may enable the intelligent zoom control block to determine the ambient light condition. Based on the zoom value received from the camera application and the lux value received from the 3A block, the intelligent zoom control block may check whether the zoom value received from the camera application, i.e. the zoom level of the contents previewed, is at a 2× zoom level or above a 2× zoom level. The intelligent zoom control block may also check whether the lux value received from the 3A block, i.e. the light condition of the contents previewed in the field of view of the QCFA sensor, is low light, normal light, bright light, or otherwise.

If the QCFA sensor is operating in the first mode, then after checking the zoom value and lux value, the intelligent zoom control block may determine whether to switch the QCFA sensor from the first mode (ex. binning mode) to the second mode (ex. remosaic mode), or to maintain the QCFA sensor in the first mode (binning mode). Similarly, in the proposed method, if the QCFA sensor is operating in the second mode, the intelligent zoom control block determines whether to switch the QCFA sensor from the second mode (remosaic mode) to the first mode (binning mode) or to maintain the QCFA sensor in the second mode (binning mode).

Depending on the zoom value and the lux value, if the QCFA sensor requires to be switched from the first mode to the second mode or from the second mode to the first mode, the intelligent zoom control block sends a command to the QCFA sensor to switch the mode and accordingly the QCFA sensor switches its mode. The intelligent zoom control block also sends a command to the image processor 660 about the crop parameters (coordinates of the four corners of the rectangle) of the contents previewed in the field of view of the QCFA sensor from the zoom value received from the camera application.

Unlike conventional systems, if the intelligent zoom control block detects that the zoom level of the contents previewed in the field of view of the QCFA sensor meets the zoom-level criteria and the light condition of the contents previewed in the field of view of the QCFA sensor meets the light criteria, the QCFA sensor may be configured by the electronic device 600 to switch from the first mode (binning mode) to the second mode (remosaic mode) to enhance a resolution of the contents previewed in the field of view of the QCFA sensor. If at least one of the zoom level of the contents previewed in the field of view of the QCFA sensor is not meeting the zoom level criteria and the light condition of the contents previewed in the field of view of the QCFA sensor is not meeting the light criteria the QCFA sensor is maintained in the first mode (binning mode).

In at least one proposed method, the Intelligent Zoom Control Block may assist in achieving an improved image quality by controlling both the QCFA sensor and the image processor 660. Depending on the zoom level of the contents previewed and the light conditions of the contents previewed, the intelligent zoom control block may intelligently select a low resolution binning mode or a high resolution remosaic mode thus maintaining optimum image quality.

Figure 9:
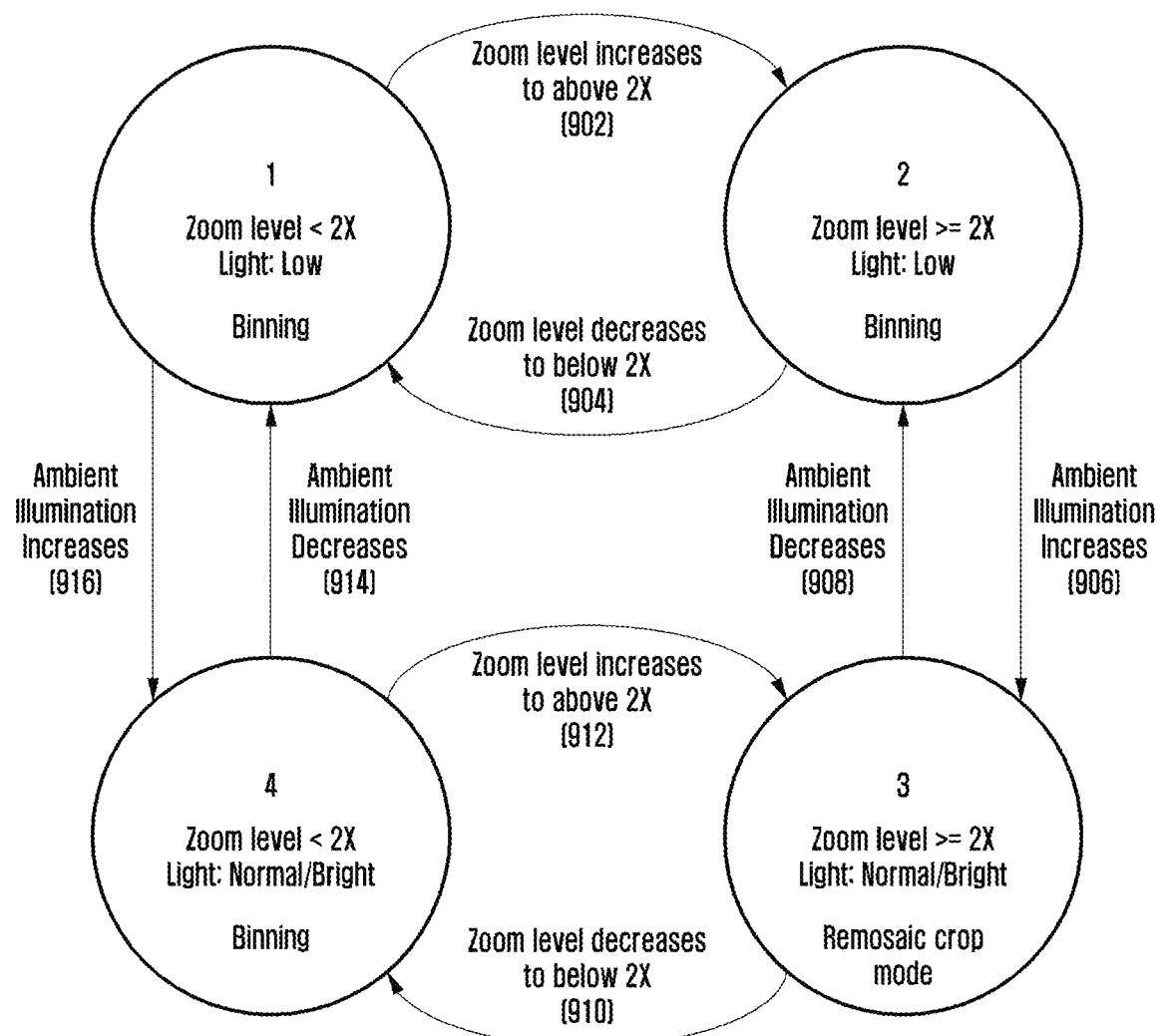
FIG. 9 illustrates a schematic diagram illustrating transition of a QCFA sensor modes based on the zoom level of the contents previewed in the field of view of a QCFA sensor, and the light condition of the contents previewed in the field of view of the QCFA sensor, according to certain embodiments of this disclosure.

FIG. 9 is an illustrative example of a schematic diagram illustrating transition of a QCFA sensor modes based on the zoom level of the contents previewed in the field of view of the QCFA sensor, and the light condition of the contents previewed in the field of view of the QCFA sensor, according certain embodiments of this disclosure.

Referring to the illustrative example of FIG. 9, at state 1, the zoom level of the contents previewed in the field of view of the QCFA sensor is less than a 2× zoom level, and a low lighting condition is present while previewing the contents in the field of view of the QCFA sensor. Thus, the QCFA sensor may operate in the binning mode. At step 902, the zoom level of the contents previewed in the field of view of the QCFA sensor is increased to above 2× zoom level but as illustrated above in state 2, since low lighting condition is prevailing while previewing the contents in the field of view of the QCFA sensor, the QCFA sensor operates in the binning mode. QCFA sensors may be sensitive to lighting conditions and operating the QCFA sensor in the binning mode in low lighting conditions may output an improved image quality. At step 904, when the zoom level of the contents previewed decreases to below 2× zoom level, the QCFA sensor returns to state 1 and operates in the binning mode. At step 906, ambient illumination increases, i.e. the lighting condition while previewing the contents in the field of view of the QCFA sensor is improved to normal or bright light. Since the zoom level of the contents previewed is greater than or equal to a 2× zoom level and the lighting condition of the contents previewed is either normal light or bright light, the QCFA sensor may begin operating in the crop remosaic mode, as illustrated in state 3 of FIG. 9. Operating the QCFA sensor in the crop remosaic mode includes switching the QCFA sensor from the binning mode to the full resolution remosaic mode and centrally cropping the contents in the remosaic mode of the QCFA sensor into half in both dimensions giving a lossless image at 2× zoom level in the crop remosaic mode. Here, the sensor output is a 2× zoomed image and further at zoom levels higher than 2×, the image processor 660 of the electronic device 600 further crops the 2× zoomed image output of the QCFA sensor based on zoom levels.

At step 910, the zoom level decreases to below 2× zoom level then the QCFA sensor starts operating in the binning mode as seen in state 4. At state 4, even if the lighting condition is a normal or bright, since the zoom level of the contents previewed has decreased to below a 2× zoom level, the QCFA sensor may operate in the binning mode. At step 912, if the zoom level of the contents previewed is increased to above a 2× zoom level, the QCFA sensor may begin operating in the remosaic crop mode (as illustrated in state 3 of FIG. 9). At step 914, the ambient illumination may decrease; i.e. the lighting condition while previewing the contents in the field of view of the QCFA sensor is a low light. The QCFA sensor may begin operating in the binning mode as illustrated in state 1 of FIG. 9. At step 916, even if the lighting condition while previewing the contents in the field of view of the QCFA sensor is a normal light or a bright light, since the zoom level is below a 2× zoom level, the QCFA sensor may operate in the binning mode, as illustrated in state 4 of FIG. 9.

Table 1 illustrates some considerations when selecting binning mode or remosaic crop mode based on the zoom level and light conditions.

TABLE 1

|  | 1.0X-1.9X | 2X | Remark |
| --- | --- | --- | --- |
| Low light | Binning mode | Binning mode | In poor lighting conditions, sensor is kept always in binning mode irrespective of zoom levels as binning mode outputs an improved signal to noise ratio in low light. |
| Normal light/Bright light | Binning mode | Remosaic crop mode | Remosaic crop mode may be used, for example, in normal/bright light conditions if the zoom level >2.0 to ensure an improved picture quality. |

To maintain a smooth transition, frequent switching between the modes is not recommended. This may be implemented by putting hysteresis after switching, i.e., updating the light condition and zoom variables only after a certain number of frames have been processed. This ensures that there is a delay of a fixed number of frames in two consecutive switches and that the sensor has settled to a stable state.

Unlike some methods and systems, the QCFA sensor may intelligently switch modes depending on the zoom level of the contents previewed in the field of view of the QCFA sensor and the light condition of the contents previewed in the field of view of the QCFA sensor thus the transition of the QCFA sensor modes intelligently maintains optimum image quality.

Figure 10:
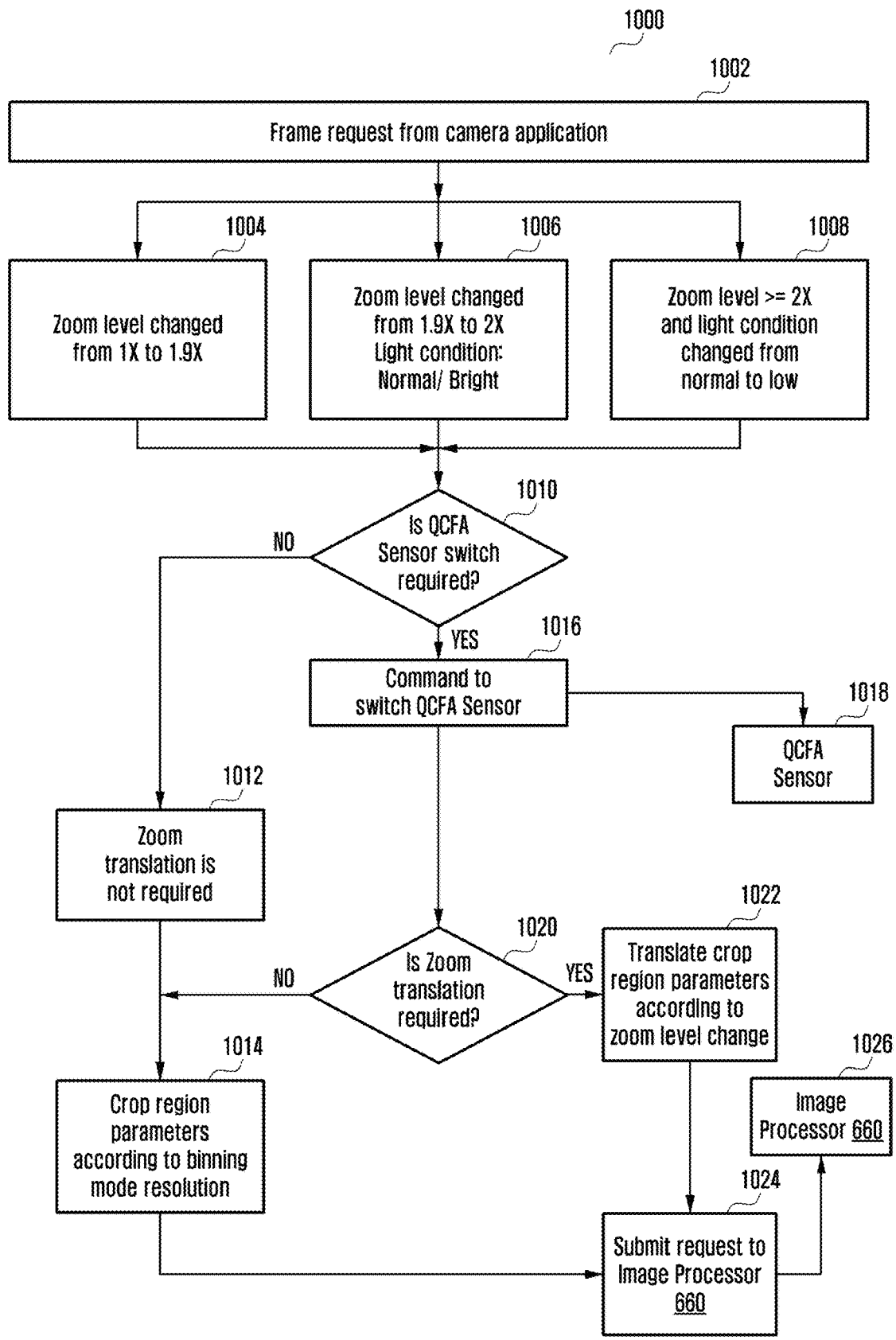
FIG. 10 illustrates a flow diagram for switching the modes of a QCFA sensor based on the zoom level of the contents previewed in the field of view of the QCFA sensor, and the light condition of the contents previewed in the field of view of the QCFA sensor, according to certain embodiments of this disclosure.

FIG. 10 illustrates a flow diagram of a flow 1000 for switching the modes of a QCFA sensor based on the zoom level of the contents previewed in the field of view of the QCFA sensor, and the light condition of the contents previewed in the field of view of the QCFA sensor, certain embodiments of this disclosure.

Referring to the illustrative example of FIG. 10, in one embodiment, at step 1002, while the user is previewing the contents in the field of view of the QCFA sensor, a frame request from the camera application indicates the region to be zoomed in. The frame request from the camera application outputs the crop regions [top, left, width, and height], representing the region to be zoomed in on. At step 1004, using the frame request from the camera application, the intelligent zoom control block may determine that the zoom level of the contents previewed is changed from 1× to 1.9×.

At step 1010, the intelligent zoom control block determines whether there is a need to switch the mode of the QCFA sensor and it is determined based on the zoom level of the contents previewed and the light condition of the contents previewed. Since the zoom level of the contents previewed is 1.9×, the QCFA sensor operates in binning mode, the QCFA sensor was also operating in the binning mode at 1× zoom level. Accordingly, it is not required to switch the mode of the QCFA sensor. At step 1012, in response to determining that there is no need to switch the mode of the QCFA sensor, the intelligent zoom control block may also determine that a zoom translation is not required. The values of the crop region may be based on the resolution of the binning mode of the QCFA sensor (fixed size); and hence, in the binning mode, these values may be forwarded to the image processor 660 without any change; i.e. a zoom translation of the values of the crop region is not required. At step 1014, in conjunction with steps 1024 and 1026, crop region parameters based on the binning mode resolution may be input to the image processor 660 of the electronic device 600.

In one embodiment, at step 1002, while the user is previewing the contents in the field of view of the QCFA sensor, a frame request from the camera application indicates the region to be zoomed in. The frame request from the camera application outputs the crop regions [top, left, width, height] representing the region which is to be zoomed in. At step 1006, using the frame request from the camera application, the intelligent zoom control block may determine that the zoom level of the contents previewed is changed from 1.9× to 2×. The intelligent zoom control block may also determine that the light condition of the contents previewed is a normal light or a bright light. At step 1010, the intelligent zoom control block may determine whether there is a need to switch the mode of the QCFA sensor, and the intelligence zoom control block may be determined based on the zoom level of the contents previewed and the light condition of the contents previewed. The zoom level of the contents previewed is changed from 1.9× to 2× and the light condition of the contents previewed is normal or bright light. Since the QCFA sensor was operating in the binning mode at a 1.9× zoom level. Thus, there is a need to switch the mode of the QCFA sensor. At step 1016 in conjunction with step 1018, in response to determining that there is need to switch the mode of the QCFA sensor from the binning mode to the remosaic crop mode, the intelligent zoom control block sends a command to the QCFA sensor to switch the mode (write I2C settings to switch the QCFA sensor). At step 1020, the intelligent zoom control block may determine whether a zoom translation is required. The values of the crop region may be based on the resolution of the binning mode of the QCFA sensor (fixed size). When the QCFA sensor is switched from the binning mode to a remosaic crop mode, zoom translation of the values of the crop region may be required. When the sensor mode is changed to the remosaic crop mode, the crop regions based on the resolution of the binning mode do not correspond to the actual field of view (FOV) of the remosaic crop mode and may need to be translated. At step 1022, in conjunction with steps 1024 and 1026, values of a crop region parameters based on the binning mode resolution of the QCFA sensor is translated by the electronic device 600 to the values according to the zoom level of the contents previewed in the field of view of the QCFA sensor and is fed to the image processor 660 of the electronic device 600.

In one embodiment, at step 1002, while the user is previewing the contents in the field of view of the QCFA sensor, the frame request from the camera application displaying or otherwise indicating the region to be zoomed in. The frame request from the camera application may output the crop regions [top, left, width, and height], indicating the region which is to be zoomed in on. At step 1008, using the frame request from the camera application, the intelligent zoom control block determines that the zoom level of the contents previewed is greater than or equal to a 2× zoom level. The intelligent zoom control block determines that the light condition of the contents previewed is changed from normal light to low light. At step 1010, the intelligent zoom control block determines whether there is a need to switch the mode of the QCFA sensor and it is determined based on the zoom level of the contents previewed and the light condition of the contents previewed. The zoom level of the contents previewed is greater than or equal to 2× zoom level, but the light condition of the contents previewed is low light. The QCFA sensor was operating in the remosaic crop mode at zoom levels greater than or equal to 2× zoom level but since the light condition is low light, there is a need to switch the mode of the QCFA sensor from the remosaic crop mode to the binning mode. At step 1016 in conjunction with step 1018, in response to determining that there is need to switch the mode of the QCFA sensor from the remosaic crop mode to the binning mode, the intelligent zoom control block sends a command to the QCFA sensor to switch the mode (write I2C settings to switch the QCFA sensor). At step 1020, the intelligent zoom control block determines whether zoom translation is required. The values of the crop region may be based on the resolution of the binning mode of the QCFA sensor (fixed size) and hence, in the binning mode, these values can be forwarded to the image processor 660 without any changes; i.e. no translation of the values of the crop region is required. At step 1014 in conjunction with steps 1024 and 1026, crop region parameters based on the binning mode resolution may be inputted to the image processor 660 of the electronic device 600.

Figure 11A:
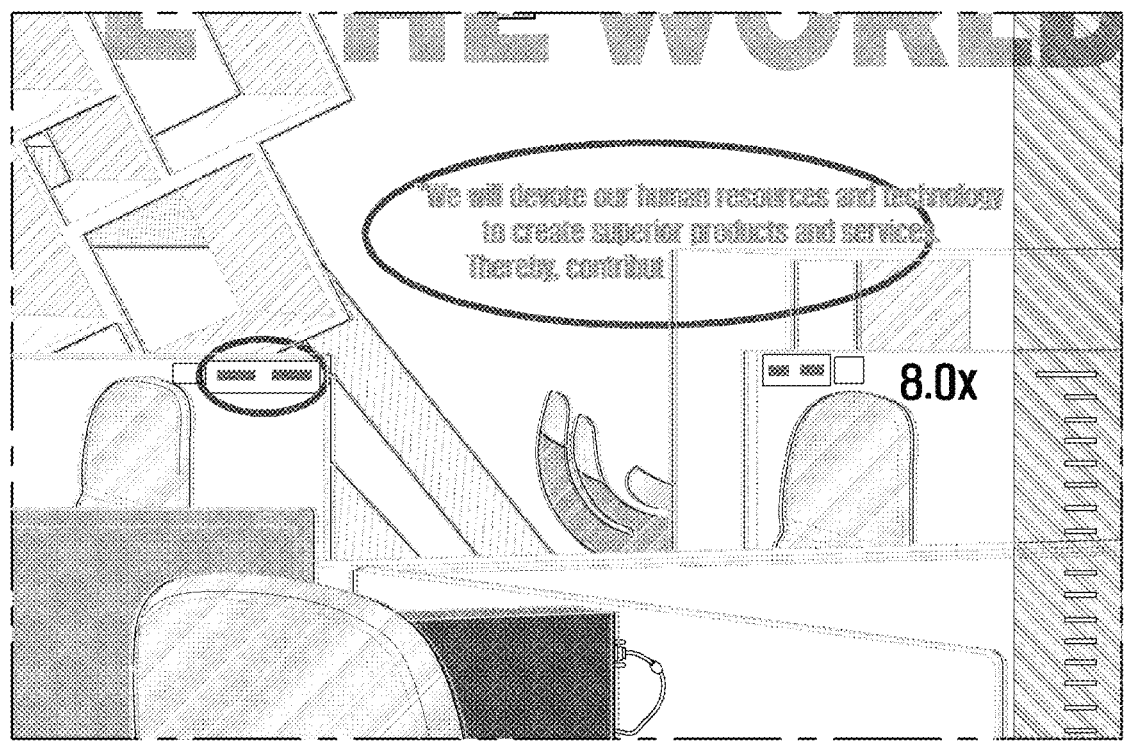
FIGS. 11A and 11B illustrate example scenarios showing image quality while previewing the image using both the prior art and a proposed method at zoom levels >2.0×, according to certain embodiments of this disclosure.
Figure 11B:
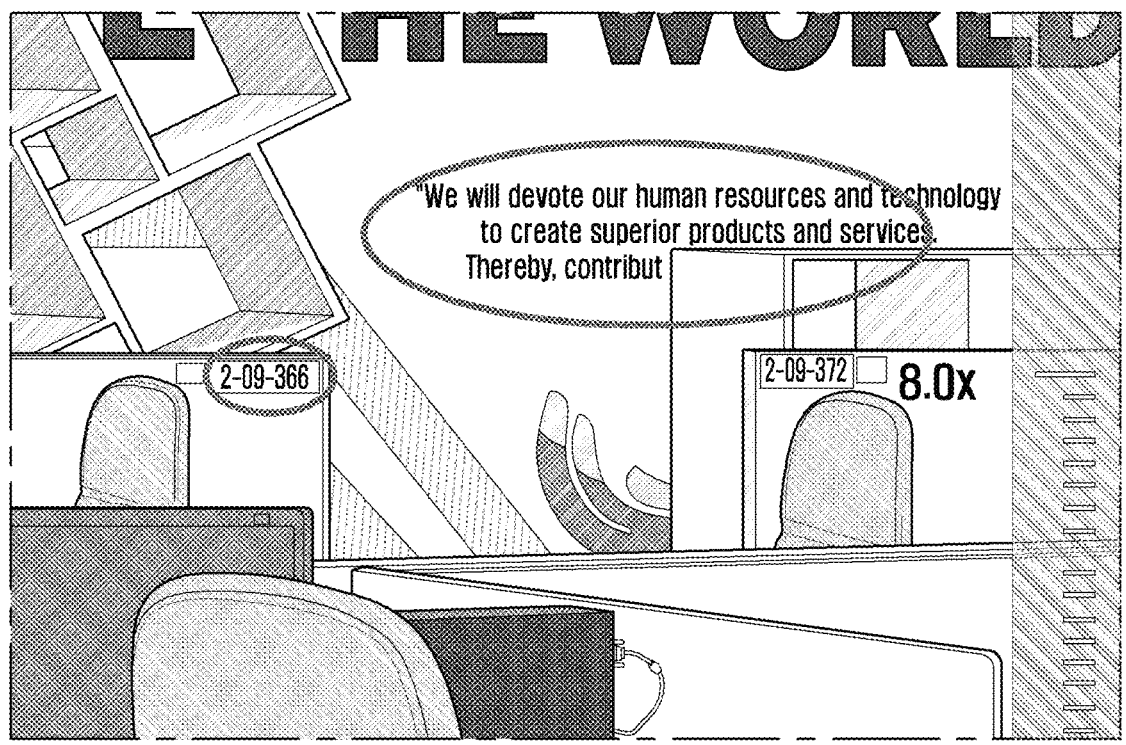

FIGS. 11A and 11B illustrate example scenarios showing image quality while previewing the image using both the prior art and the proposed method at zoom levels >2.0×, according to certain embodiments of this disclosure.

As illustrated in the example of FIG. 11B, the proposed method may display sharper text in the scene when the preview is zoomed to 8× and the overall image is more clearly focused when compared to a preview image of other methods.

Figure 12A:
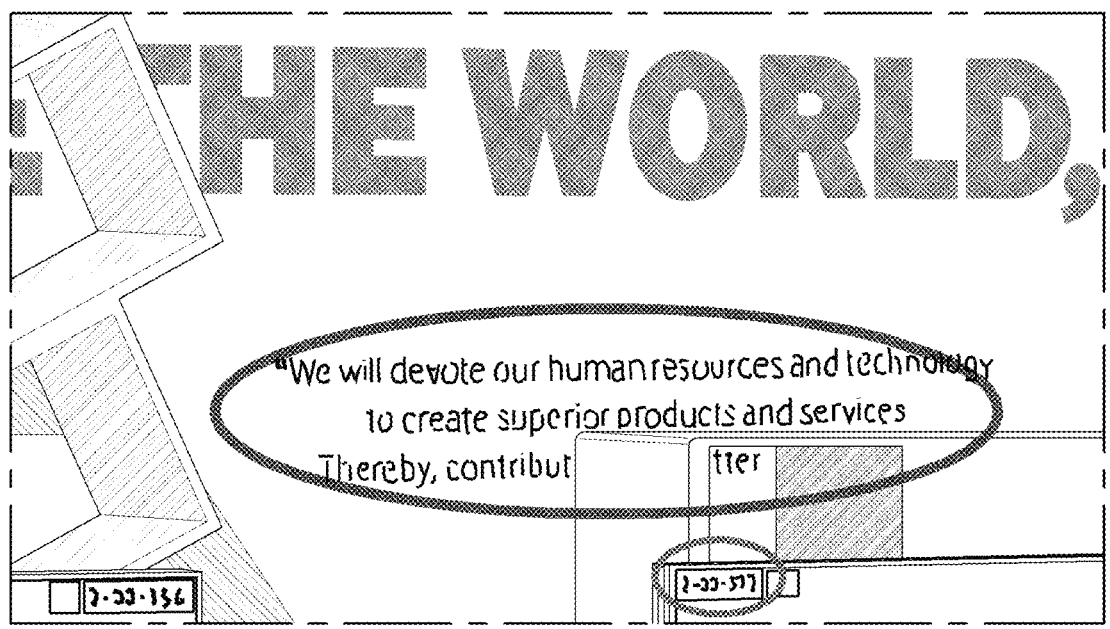
FIGS. 12A and 12B illustrate example scenarios showing image quality while capturing the image using both the prior art and the proposed method at zoom levels >2.0×, according to certain embodiments of this disclosure.
Figure 12B:
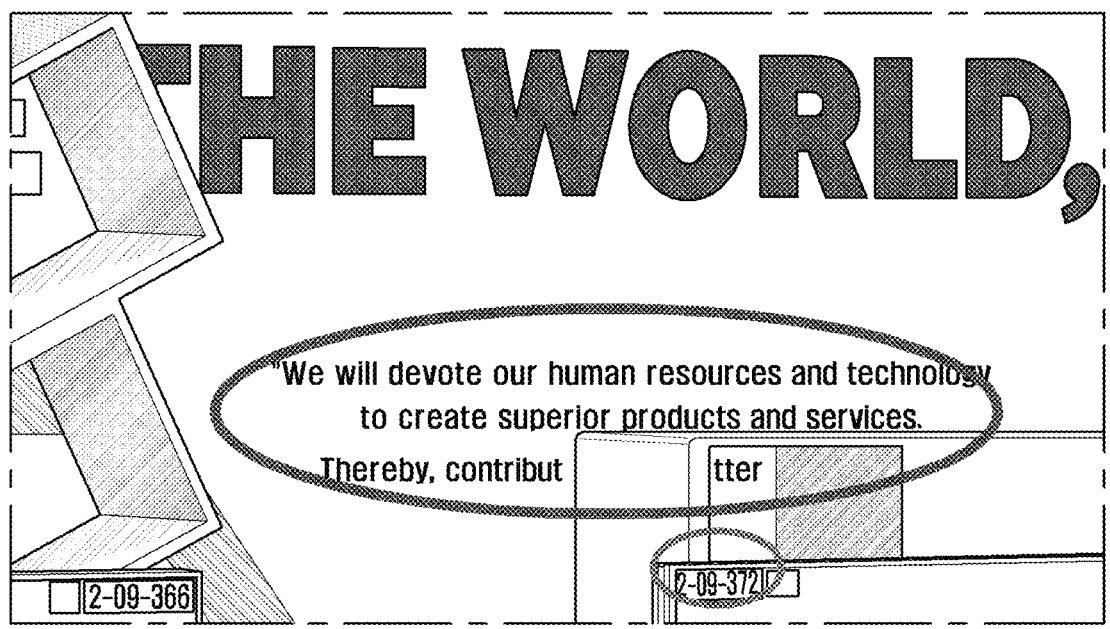

FIGS. 12A and 12B illustrate example scenarios showing image quality while capturing the image using both the prior art and the proposed method at zoom levels >2.0×, according to certain embodiments of this disclosure.

As illustrated in the example of FIG. 12B, the proposed method may output sharper text and may also add additional details to the scene when the image is captured at 2× and zoomed in on again above a 2× zoom.

Figure 13A:
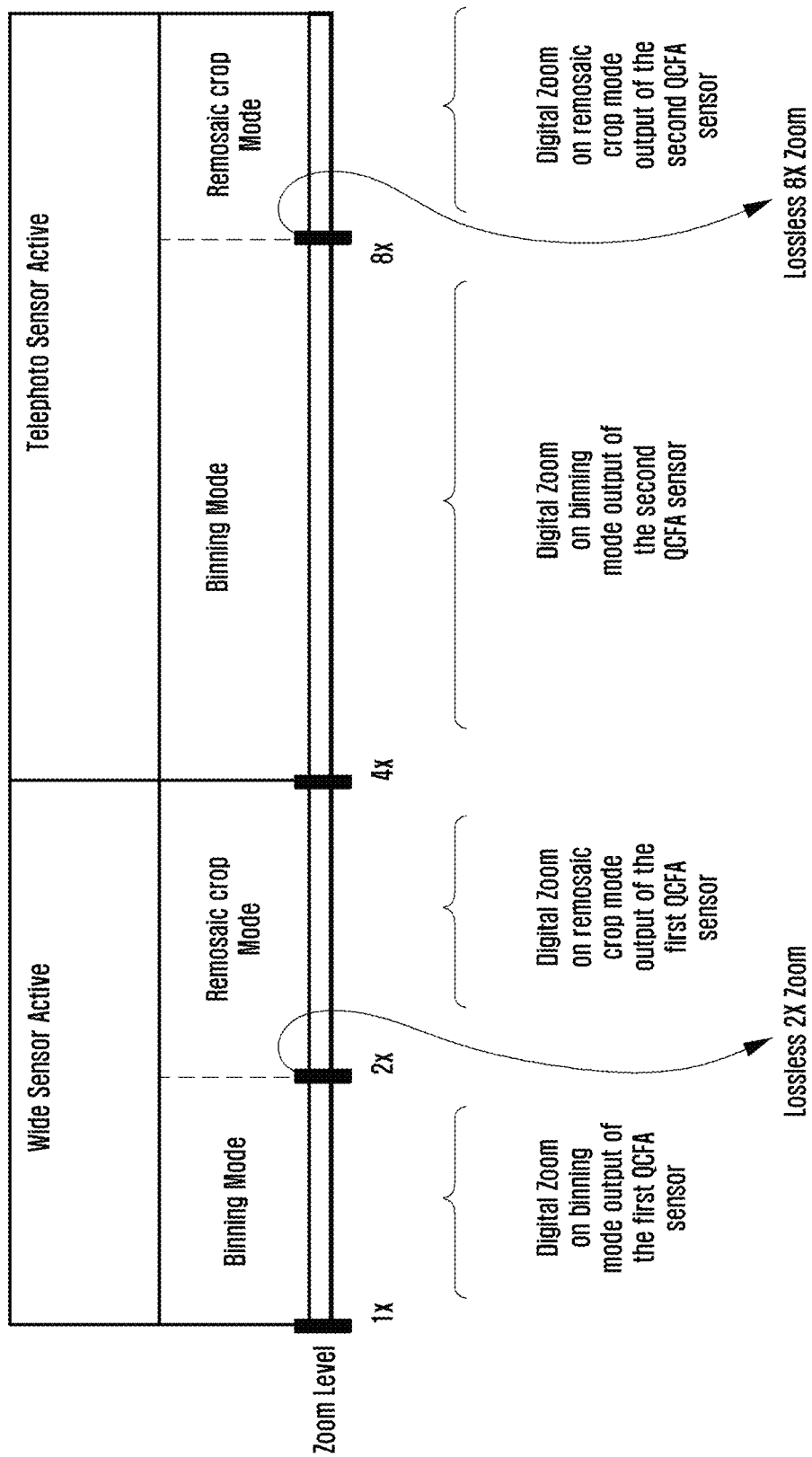
FIGS. 13A and 13B illustrate schematic diagrams illustrating multiple QCFA sensors for obtaining a lossless image at 8× zoom level, according to certain embodiments of this disclosure.
Figure 13B:
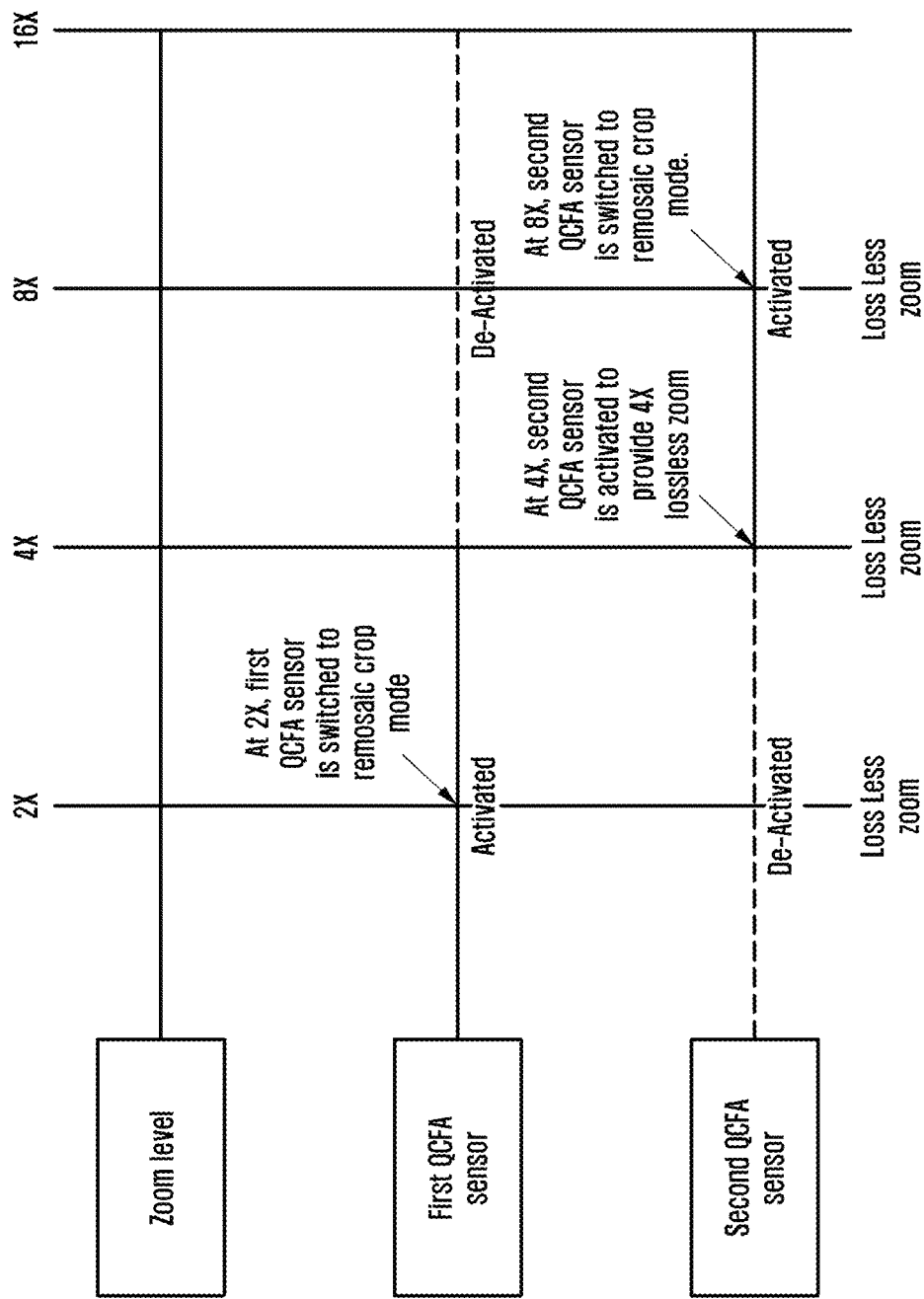

FIGS. 13A and 13B illustrate schematic diagrams of multiple QCFA sensors for obtaining a lossless image at 8× zoom level, according to certain embodiments of this disclosure.

Figure 2:
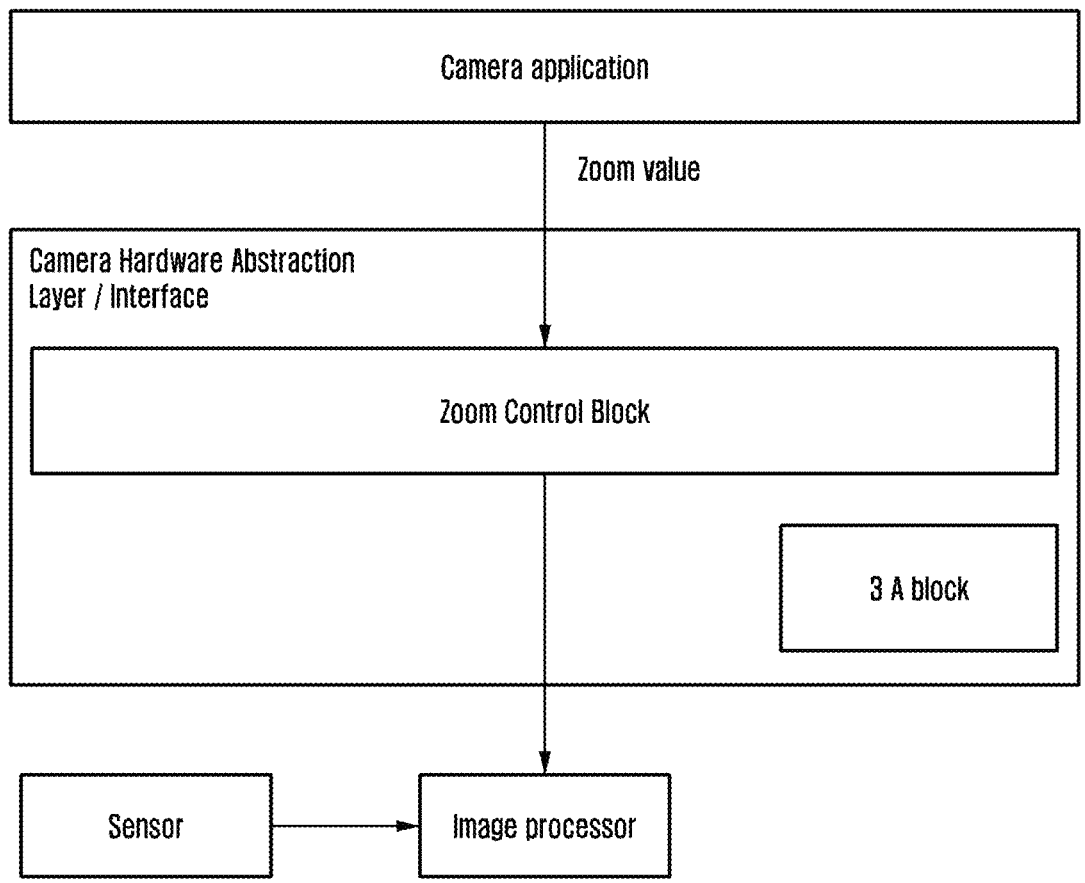
FIG. 2 illustrates a block diagram of an implementation flow for zooming in the contents previewed, according to a prior art.

Referring to the illustrative example of FIG. 13A, 2 QCFA sensors are used in order to obtain a lossless zoom at an 8× zoom level. A first QCFA sensor may operate as a wide angle camera and a second QCFA sensor may operate as a tele photo camera such that the second QCFA sensor begins operating at 4a× zoom level of the first QCFA sensor. The second QCFA sensor has a base field of view (FOV) same as the FOV of the first QCFA sensor cropped centrally to a 4.0× zoom.

The second QCFA camera may be activated at a zoom-level of 4.0×. Between 4.0×-8.0× zoom levels, the second QCFA sensor may operate in a binning mode and may be switched to a remosaic crop mode at 8.0×. As a result, the zoom at 8.0× is lossless.

Referring to the illustrative example of FIG. 13B, the method for content enhancement using multiple QCFA sensors is shown. This proposed method may include previewing, by the electronic device 600, contents in a field of view of the first QCFA sensor. The first QCFA sensor may be operating in the first mode (ex., a binning mode). When the zoom level of the contents previewed meets a first zoom level criteria (2× zoom level, as illustrated by the example in FIG. 13B) and the light conditions of the contents previewed meets the light criteria (normal light or bright light), the first QCFA sensor may be switched, by the electronic device 600, to a remosaic crop mode for enhancing a resolution of the contents previewed in the field of view of the first QCFA sensor. For operating the first QCFA sensor in the remosaic crop mode, the first QCFA sensor may be switched to the second mode (remosaic mode) and may be centrally cropped by the electronic device 600; i.e., the contents previewed in the second mode of the first QCFA sensor into half in both dimensions (i.e. half of the width and half of the height). As illustrated in FIG. 13B, after a 2× zoom level, the first QCFA sensor may be operating in the remosaic crop mode. When the zoom level of the contents previewed in the field of view of the first QCFA sensor meets a second zoom level criteria (for example, a 4× zoom level, as illustrated in FIG. 13B), the second QCFA sensor may be activated by the electronic device 600. When the second QCFA sensor is activated, the first QCFA sensor is deactivated by the electronic device 600. Activating the second QCFA sensor at 4× zoom level, outputs a lossless zoom at 4×. The proposed method includes previewing, by the electronic device 600, the contents in the field of view of the second QCFA sensor. The second QCFA sensor is operating in the first mode (binning mode).

When the zoom level of the contents previewed meets a third zoom level criteria (for example, an 8× zoom level, as illustrated in FIG. 13B) and the light conditions of the contents previewed meets the light criteria (normal light or bright light), the second QCFA sensor may be switched by the electronic device 600 to a remosaic crop mode for enhancing the resolution of the contents previewed in the field of view of the second QCFA sensor. For operating the second QCFA sensor in the remosaic crop mode, the second QCFA sensor may be switched to the second mode (remosaic mode), and may be centrally cropped by the electronic device 600; i.e., the contents previewed in the second mode of the second QCFA sensor into half of the width and half of the height.

At an 8× zoom, the second QCFA sensor (tele QCFA sensor) may be switched to a remosaic crop mode to output a 2× lossless zoom for the second QCFA sensor, which translates to 4*2=8× lossless zoom.

Figure 14A:
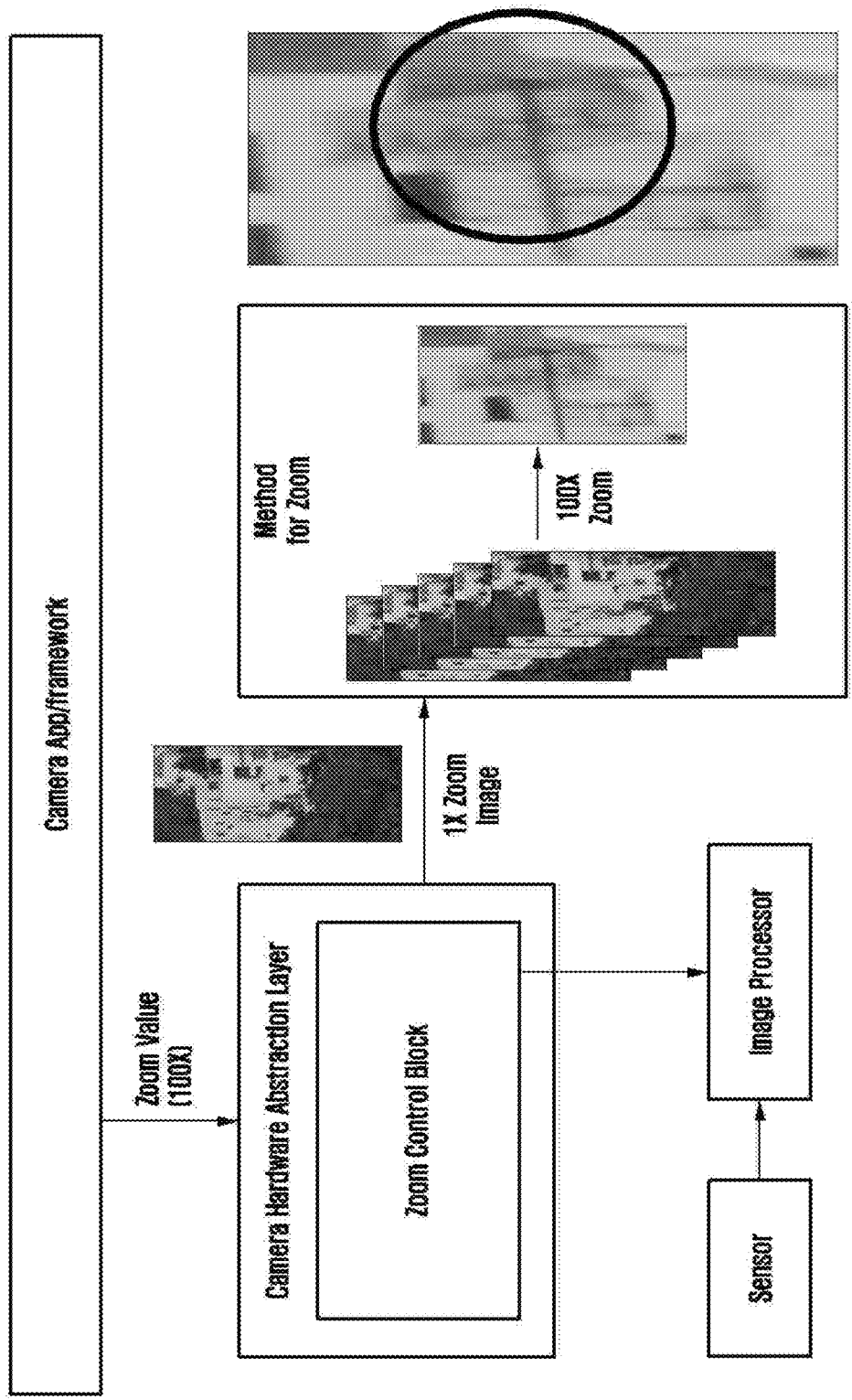
FIGS. 14A and 14B illustrate example scenarios illustrating a digital zoom solution enhancement at 100× using a prior art method and a proposed method, according to certain embodiments of this disclosure.
Figure 14B:
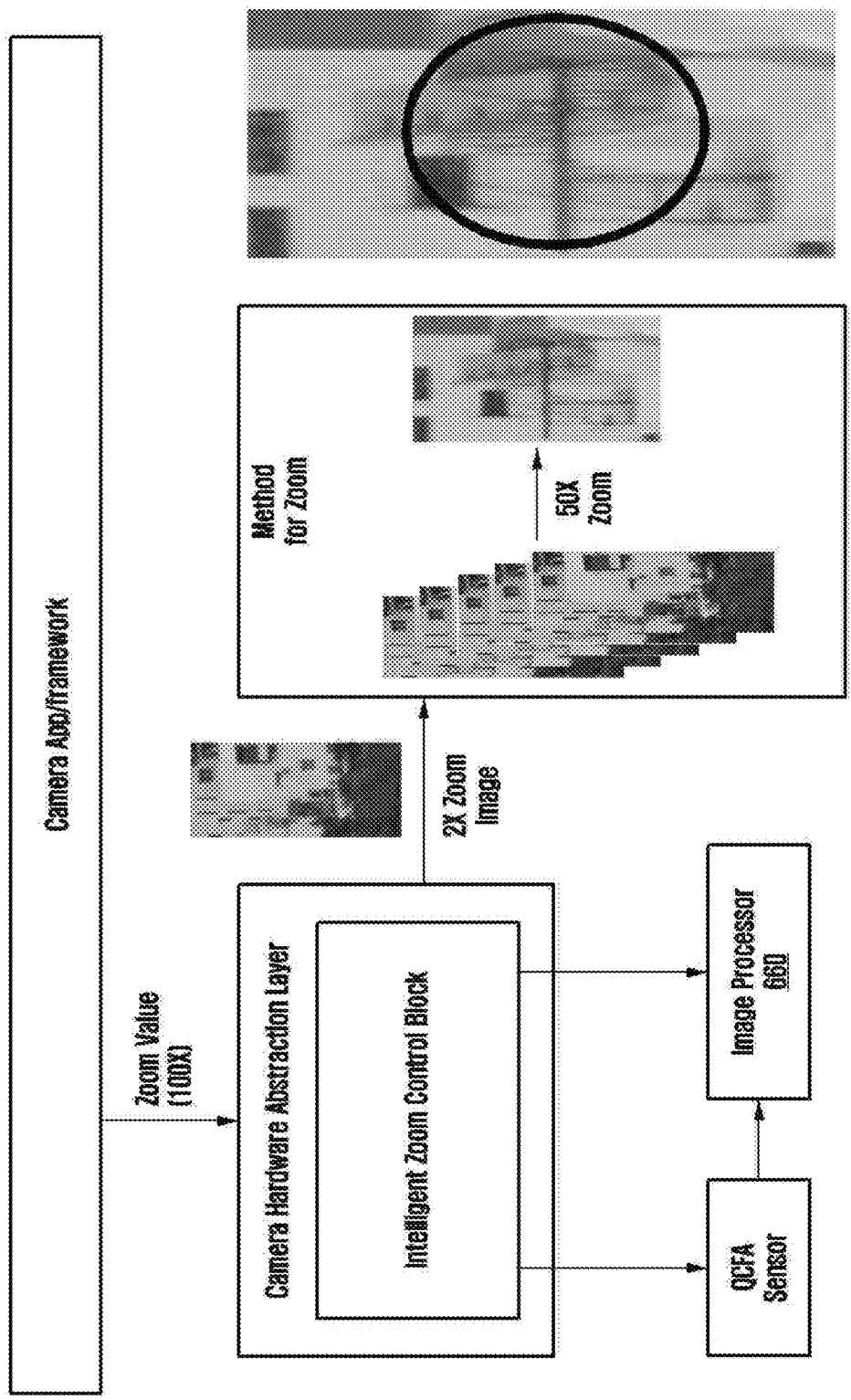

FIGS. 14A and 14B illustrate example scenarios illustrating a digital zoom solution enhancement at 100× using a prior art method as well as a proposed method, according to certain embodiments of this disclosure.

Referring to the illustrative example of FIG. 14B, a digital zoom approach in existing methods may use multiple frames taken from the sensor and noise reduction methods and frame fusion methods to output a final zoomed image output. At least one proposed method for content enhancement (lossless zoom) can be applied along with existing digital solutions to enhance the image capture capability at zoom levels such as 30×, 50×, 100× and so on. As illustrated in FIG. 14B, since a proposed method outputs a lossless 2× image, only a 50× zoom may need to be applied by existing digital solutions on input images in order to obtain a 100× zoom image. The resulting image at 100× zoom (illustrated in the example in FIG. 14B) illustrates improvement with respect to the image details as compared to a 100× zoom image using a prior art method.

Figure 15A:
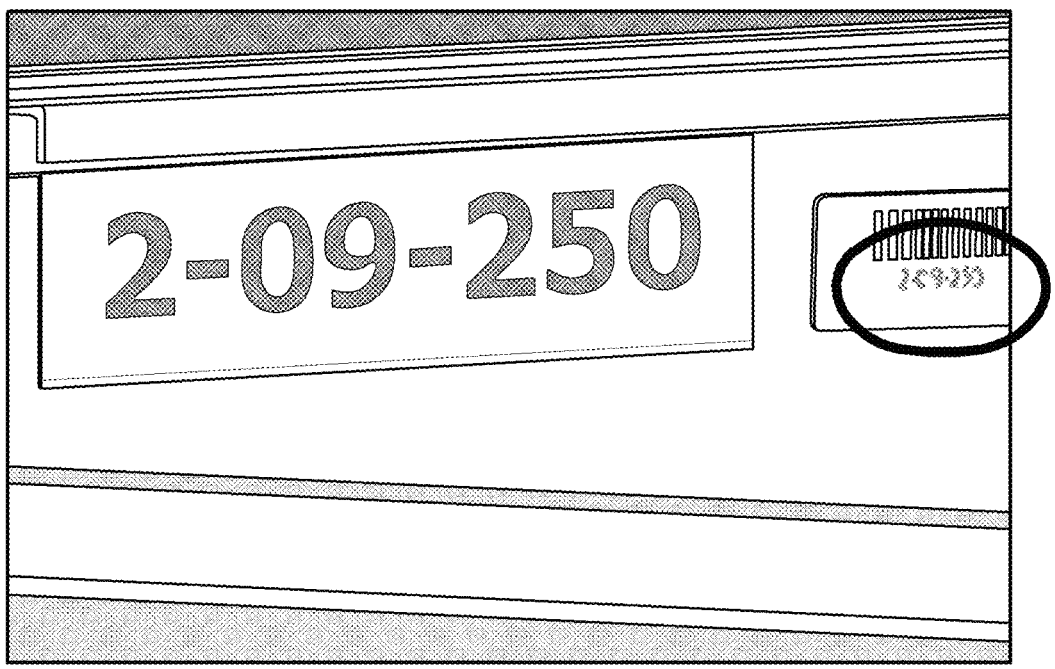
FIGS. 15A and 15B illustrate examples of images captured using a digital zoom solution enhancement for both a prior art method and a proposed method at zoom levels 30×, according to certain embodiments of this disclosure.
Figure 15B:
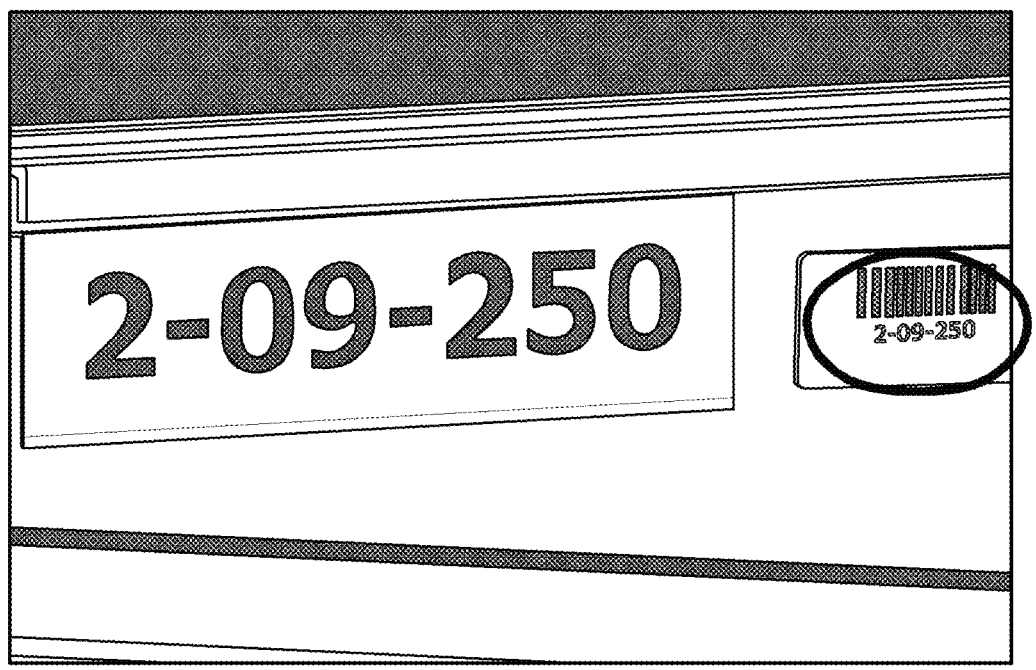

FIGS. 15A and 15B illustrate examples of images captured using digital zoom solution enhancement for both a prior art method and a proposed method at zoom levels 30×, according to certain embodiments of this disclosure.

Figure 16A:
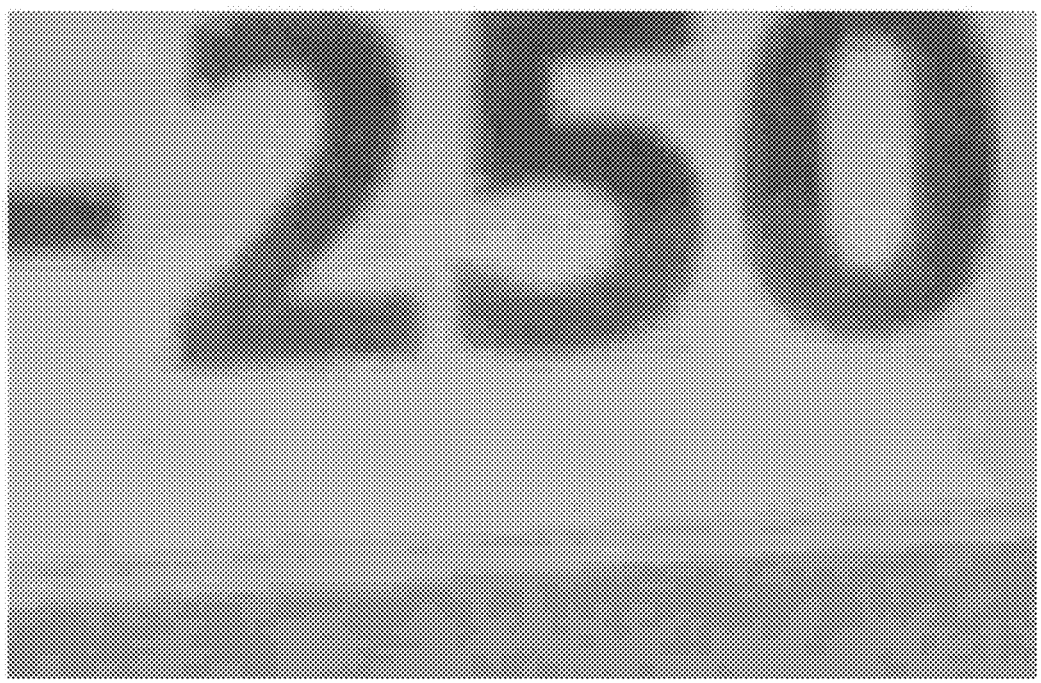
FIGS. 16A and 16B illustrate examples of images captured using digital zoom solution enhancement for both a prior art and a proposed method at zoom levels 100×, according to certain embodiments of this disclosure.
Figure 16B:

FIGS. 16A and 16B illustrate examples of images captured using digital zoom solution enhancement for both a prior art method and a proposed method at zoom levels 100×, according to certain embodiments of this disclosure.

As illustrated in the examples in FIG. 15B and FIG. 16B, images captured with proposed solution may be more focused, sharper, and preserve image details even at 100× zoom levels.

Unlike some existing systems, the proposed methods for content enhancement using QCFA sensor of the electronic device 600 may output a lossless image quality at zoom levels of 2× as wells as above 2× zoom levels, resulting in high detailed images. In a proposed method, the previewed image and the captured image at zoom levels 2× and above are sharper and more focused. When a subject of the image or the contents of the image are sharp, the image appears clear, and may convey additional details resulting in enhanced contents in the field of view of the QCFA sensor (high detailed image). By using multiple QCFA sensors, a further lossless image at 8× zoom level is possible.

The embodiments disclosed herein can be implemented through at least one software program running on at least one hardware device and performing network management functions to control the elements. The elements shown in the FIGS. 3 to 16 include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of an electronic device having a Quad Color Filter Array (QCFA) sensor, the method comprising:
   previewing, by the electronic device, contents in a field of view of a first QCFA sensor of the electronic device, wherein during the previewing, the first QCFA sensor operates in a first mode and performs a first operation that reduces image data by combining a cluster of adjacent pixels into one pixel and outputs the reduced image data to an image processor;

detecting, by the electronic device, whether a zoom level of the contents previewed meets a first zoom-level criteria, and detecting, by the electronic device, whether a light condition of the contents previewed meets a light criteria;

in response to detecting that the zoom level of the contents previewed in the field of view of the first QCFA sensor meets the first zoom-level criteria, and the light condition of the contents previewed in the field of view of the first QCFA sensor meets the light criteria, configuring the first QCFA sensor to switch from the first mode to a second mode and previewing, by the electronic device, the contents in a field of view of the first QCFA sensor of the electronic device, wherein the first QCFA sensor performs, in the second mode, a second operation for displaying the contents previewed in an enhanced resolution that acquires image data by rearranging pixels from a quad bayer pattern to a bayer pattern, centrally cropping the acquired image data into half of a width and a height of the acquired image data, and outputting the cropped image data to the image processor, and wherein while 2× zoom level is equal to the zoom level of the contents previewed in the field of view of the first QCFA sensor, the image processor receives the cropped image data having a number (N) of megapixels and outputs a lossless image having an equal N megapixels as the received cropped image data; and maintaining the first QCFA sensor in the first mode in response to detecting that at least one of the zoom level of the contents previewed in the field of view of the first QCFA sensor does not meet the first zoom-level criteria, and the light condition of the contents previewed in the field of view of the first QCFA sensor does not meet the light criteria, wherein while 1× zoom level is equal to the zoom level of the contents previewed in the field of view of the first QCFA sensor, the image processor receives the reduced image data having the number (N) of megapixels and outputs a lossless image having an equal N megapixels as the received reduced image data.

2. The method as claimed in claim 1, further comprising, after configuring the first QCFA sensor to switch from the first mode to the second mode, determining, by the electronic device, whether the zoom level of the contents previewed meets a second zoom-level criteria.

3. The method as claimed in claim 2, further comprising:

previewing, by the electronic device, the contents in the field of view of a second QCFA sensor in response to the zoom level of the contents previewed meets the second zoom-level criteria, wherein the second QCFA sensor performs in the first mode the first operation;

detecting, by the electronic device, whether the zoom level of the contents previewed in the field of view of the second QCFA sensor meets a third zoom-level criteria, and detecting, by the electronic device, whether the light condition of the contents previewed in the field of view of the second QCFA sensor meets the light criteria;

in response to detecting that the zoom level of the contents previewed in the field of view of the second QCFA sensor meets the third zoom-level criteria, and the light condition of the contents previewed in the field of view of the second QCFA sensor meets the light criteria, configuring the second QCFA sensor to switch from the first mode to the second mode and previewing, by the electronic device, the contents in the field of view of the second QCFA sensor, wherein the second QCFA sensor performs in the second mode the second operation; and maintaining the second QCFA sensor in the first mode in response to detecting that at least one of the zoom level of the contents previewed in the field of view of the second QCFA sensor does not meet the third zoom-level criteria and the light condition of the contents previewed in the field of view of the second QCFA sensor does not meet the light criteria.

4. An electronic device comprising:

a first Quad Color Filter Array (QCFA) sensor;
a communicator;
a memory; and
a processor coupled to the memory and the communicator, wherein the processor is configured to:

preview contents in a field of view of a first QCFA sensor of the electronic device, wherein during the previewing, the first QCFA sensor operates in a first mode and performs a first operation that reduces image data by combining a cluster of adjacent pixels into one pixel and outputs the reduced image data to an image processor;

detect whether a zoom level of the contents previewed meets a first zoom-level criteria, and detect whether a light condition of the contents previewed meets a light criteria;

in response to detecting that the zoom level of the contents previewed in the field of view of the first QCFA sensor meets the first zoom-level criteria, and the light condition of the contents previewed in the field of view of the first QCFA sensor meets the light criteria, configure the first QCFA sensor to switch from the first mode to a second mode and preview the contents in a field of view of the first QCFA sensor, wherein the first QCFA sensor performs in the second mode a second operation for displaying the contents previewed in an enhanced resolution that acquires image data by rearranging pixels from a quad bayer pattern to a bayer pattern, centrally cropping the acquired image data into half of a width and a height of the acquired image data, and outputting the cropped image data to the image processor; and maintain the first QCFA sensor in the first mode in response to detecting that at least one of the zoom level of the contents previewed in the field of view of the first QCFA sensor is not meeting the first zoom-level criteria and the light condition of the contents previewed in the field of view of the first QCFA sensor is not meeting the light criteria.

5. The electronic device as claimed in claim 4, wherein, after configuring the first QCFA sensor to switch from the first mode to the second mode, the processor is further configured to:

determine, by the electronic device, whether the zoom level of the contents previewed meets a second zoom-level criteria.

6. The electronic device as claimed in claim 5, further comprising a second QCFA sensor, and wherein the processor is further configured to:

preview the contents in the field of view of a second QCFA sensor in response to the zoom level of the contents previewed meets the second zoom-level criteria, wherein the second QCFA sensor performs in the first mode the first operation;

detect whether the zoom level of the contents previewed in the field of view of the second QCFA sensor meets a third zoom-level criteria, and detect whether the light condition of the contents previewed in the field of view of the second QCFA sensor meets the light criteria; in response to detecting that the zoom level of the contents previewed in the field of view of the second QCFA sensor meets the third zoom-level criteria, and the light condition of the contents previewed in the field of view of the second QCFA sensor meets the light criteria, configure the second QCFA sensor to switch from the first mode to the second mode and preview the contents in the field of view of the second QCFA sensor, wherein the second QCFA sensor performs in the second mode the second operation; and maintain the second QCFA sensor in the first mode in response to detecting that at least one of the zoom level of the contents previewed in the field of view of the second QCFA sensor is not meeting the third zoom-level criteria and the light condition of the contents previewed in the field of view of the second QCFA sensor is not meeting the light criteria.

7. A non-transitory computer readable medium comprising instructions, that when executed by a processor of an electronic device, cause the electronic device to:

preview contents in a field of view of a first QCFA sensor of the electronic device; wherein during the previewing, the first QCFA sensor is operating in a first mode and performing a first operation that reduces image data by combining a cluster of adjacent pixels into one pixel and outputs the reduced image data to an image processor;

detect whether a zoom level of the contents previewed meets a first zoom-level criteria, and detect whether a light condition of the contents previewed meets a light criteria;

in response to detecting that the zoom level of the contents previewed in the field of view of the first QCFA sensor meets the first zoom-level criteria, and the light condition of the contents previewed in the field of view of the first QCFA sensor meets the light criteria, configure the first QCFA sensor to switch from the first mode to a second mode and preview the contents in a field of view of the first QCFA sensor, wherein the first QCFA sensor is performing in the second mode a second operation for displaying the contents previewed in an enhanced resolution that acquires image data by rearranging pixels from a quad bayer pattern to a bayer pattern, centrally cropping the acquired image data into half of a width and a height of the acquired image data, and outputting the cropped image data to the image processor, and wherein while 2× zoom level is equal to the zoom level of the contents previewed in the field of view of the first QCFA sensor, the image processor receives the cropped image data having a number (N) of megapixels and outputs a lossless image having an equal N megapixels as the received cropped image data; and maintain the first QCFA sensor in the first mode in response to detecting that at least one of the zoom level of the contents previewed in the field of view of the first QCFA sensor does not meet the first zoom-level criteria, and the light condition of the contents previewed in the field of view of the first QCFA sensor does not meet the light criteria, wherein while 1× zoom level is equal to the zoom level of the contents previewed in the field of view of the first QCFA sensor, the image processor receives the reduced image data having the number (N) of megapixels and outputs a lossless image having an equal N megapixels as the received reduced image data.

8. The computer readable medium of claim 7, further comprising instructions, that when executed by the processor, cause the electronic device to, after configuring the first QCFA sensor to switch from the first mode to the second mode, determine whether the zoom level of the contents previewed meets a second zoom-level criteria.

9. The computer readable medium of claim 8, further comprising instructions, that when executed by the processor, cause the electronic device to:

preview the contents in the field of view of a second QCFA sensor in response to the zoom level of the contents previewed meets the second zoom-level criteria, wherein the second QCFA sensor is performing in the first mode the first operation;

detect whether the zoom level of the contents previewed in the field of view of the second QCFA sensor meets a third zoom-level criteria, and detecting whether the light condition of the contents previewed in the field of view of the second QCFA sensor meets the light criteria;

in response to detecting that the zoom level of the contents previewed in the field of view of the second QCFA sensor meets the third zoom-level criteria, and the light condition of the contents previewed in the field of view of the second QCFA sensor meets the light criteria, configure the second QCFA sensor to switch from the first mode to the second mode and preview the contents in the field of view of the second QCFA sensor, wherein the second QCFA sensor is performing in the second mode the second operation; and maintain the second QCFA sensor in the first mode in response to detecting that at least one of the zoom level of the contents previewed in the field of view of the second QCFA sensor.

* * * * *